(12) United States Patent
Yanagita et al.

(10) Patent No.: US 9,164,621 B2
(45) Date of Patent: Oct. 20, 2015

(54) STEREOSCOPIC DISPLAY APPARATUS AND STEREOSCOPIC SHOOTING APPARATUS, DOMINANT EYE JUDGING METHOD AND DOMINANT EYE JUDGING PROGRAM FOR USE THEREIN, AND RECORDING MEDIUM

(75) Inventors: Satoshi Yanagita, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 461 days.

(21) Appl. No.: 13/581,617

(22) PCT Filed: Oct. 29, 2010

(86) PCT No.: PCT/JP2010/069275
§ 371 (c)(1),
(2), (4) Date: Aug. 29, 2012

(87) PCT Pub. No.: WO2011/114567
PCT Pub. Date: Sep. 22, 2011

(65) Prior Publication Data
US 2012/0320047 A1 Dec. 20, 2012

(30) Foreign Application Priority Data

Mar. 18, 2010 (JP) .................................. 2010-062869
Jun. 29, 2010 (JP) .................................. 2010-147509

(51) Int. Cl.
*G06F 3/041* (2006.01)
*H04N 13/00* (2006.01)
(Continued)

(52) U.S. Cl.
CPC .............. *G06F 3/0418* (2013.01); *G06F 3/013* (2013.01); *H04N 13/004* (2013.01);
(Continued)

(58) Field of Classification Search
CPC .......... H04N 13/0018; H04N 13/0468; H04N 13/0025; H04N 2213/008; G06F 3/013; G06F 3/017; G06T 2207/10021; G06T 7/0075
USPC ...................................... 348/51; 345/679, 680
See application file for complete search history.

(56) References Cited

U.S. PATENT DOCUMENTS 5,875,018 A * 2/1999 Lamprecht .................... 351/208
6,466,255 B1 10/2002 Kagita et al.
(Continued)

FOREIGN PATENT DOCUMENTS

EP  1021049 A2  7/2000
EP  2046020 A1  4/2009
(Continued)

OTHER PUBLICATIONS

Japanese Office Action for Japanese Application No. 2012-505443, dated Sep. 26, 2013, with partial English translation.
(Continued)

*Primary Examiner* — Brian Yenke
(74) *Attorney, Agent, or Firm* — Birch, Stewart, Kolasch & Birch, LLP

(57) ABSTRACT

A stereoscopic display apparatus comprising a judging part judging the dominant eye of the user inputting the position coordinates via the coordinate input part based on the reference coordinates of the dominant eye judgment image formed of the left viewpoint image and the right viewpoint image and the obtained position coordinates, depending on whether the obtained position coordinates are near the reference coordinates of the left viewpoint image or the reference coordinates of the right viewpoint image.

16 Claims, 25 Drawing Sheets

(51) Int. Cl.
*G09G 3/00* (2006.01)
*H04N 13/04* (2006.01)
*G06F 3/01* (2006.01)

(52) U.S. Cl.
CPC ...... *H04N 13/0018* (2013.01); *H04N 13/0468* (2013.01); *G09G 3/003* (2013.01); *G09G 2320/06* (2013.01); *G09G 2354/00* (2013.01)

(56) References Cited

U.S. PATENT DOCUMENTS

| | | | |
|---|---|---|---|
| 6,584,219 B1* | 6/2003 | Yamashita et al. | 382/154 |
| 7,830,607 B2* | 11/2010 | Hotta et al. | 359/630 |
| 8,057,036 B2* | 11/2011 | Hess et al. | 351/201 |
| 8,284,235 B2* | 10/2012 | Held et al. | 348/42 |
| 8,558,875 B2* | 10/2013 | Morino et al. | 348/51 |
| 8,880,336 B2* | 11/2014 | van Os et al. | 701/412 |
| 2006/0098282 A1* | 5/2006 | McCart et al. | 359/472 |
| 2009/0091654 A1 | 4/2009 | Nakamura et al. | |
| 2009/0237803 A1 | 9/2009 | Hotta et al. | |
| 2011/0032328 A1* | 2/2011 | Raveendran et al. | 348/43 |
| 2011/0032329 A1* | 2/2011 | Bauza et al. | 348/43 |
| 2011/0032338 A1* | 2/2011 | Raveendran et al. | 348/51 |
| 2011/0228049 A1* | 9/2011 | Kazakevich et al. | 348/45 |
| 2011/0298702 A1* | 12/2011 | Sakata et al. | 345/156 |
| 2012/0019527 A1* | 1/2012 | Ugawa | 345/419 |
| 2013/0120362 A1* | 5/2013 | Harris et al. | 345/419 |
| 2013/0182086 A1* | 7/2013 | Evans et al. | 348/53 |
| 2013/0258463 A1* | 10/2013 | Evans et al. | 359/464 |
| 2014/0063083 A1* | 3/2014 | Hamagishi et al. | 345/694 |
| 2014/0184494 A1* | 7/2014 | Burachas | 345/156 |
| 2014/0200079 A1* | 7/2014 | Bathiche et al. | 463/32 |
| 2014/0253698 A1* | 9/2014 | Evans et al. | 348/54 |

FOREIGN PATENT DOCUMENTS

| | | |
|---|---|---|
| JP | 10-105735 A | 4/1998 |
| JP | 2000-209614 A | 7/2000 |
| JP | 2004-280496 A | 10/2004 |
| JP | 2004-362218 A | 12/2004 |
| JP | 2006-293909 A | 10/2006 |
| JP | 2009-94726 A | 4/2009 |
| JP | 2009-229752 A | 10/2009 |

OTHER PUBLICATIONS

Forms PCT/IB/326, PCT/IB/373, and PCT/ISA/237, mailed Sep. 27, 2012 for International Application No. PCT/JP2010/069275.
Forms PCT/IB/373 and PCT/ISA/237, issued Oct. 23, 2012, for International Application No. PCT/JP2010/069275.
International Search Report issued in PCT/JP2010/069275, mailed on Dec. 28, 2010.
Written Opinion of the International Searching Authority issued in PCT/JP2010/069275, mailed on Dec. 28, 2010.
Chinese Office Action and Search Report, dated Dec. 2, 2014, for Chinese Application No. 201080065556.9, with English translation.

* cited by examiner

STEREOSCOPIC DISPLAY APPARATUS AND STEREOSCOPIC SHOOTING APPARATUS, DOMINANT EYE JUDGING METHOD AND DOMINANT EYE JUDGING PROGRAM FOR USE THEREIN, AND RECORDING MEDIUM

TECHNICAL FIELD

The present invention relates to a stereoscopic display apparatus and stereoscopic shooting method and, in particular, to a technology of judging a dominant eye of a user by using the stereoscopic display apparatus.

BACKGROUND ART

Conventionally, an apparatus has been suggested (Patent Document 1) in which, when an operation element is stereoscopically displayed on a screen and an operator touches a touch panel, an operation instruction to the operation element stereoscopically displayed by a stereoscopic display apparatus is detected based on coordinate data indicating the touched position, a parallax image of the operation element formed by a stereoscopic merging part is changed, and the shape of the operation element stereoscopically displayed on the stereoscopic display apparatus is changed. For example, when the operation element is represented by an image of a push-button-type switch, if the image of the switch is touched on the touch panel for ON/OFF, display of the image of the switch is changed to stereoscopic display or flat display according to ON/OFF, thereby improving operability.

Also, an operation panel apparatus has been suggested (Patent Document 2) in which a stereoscopic parallax image is displayed on a display part and is switched to a flat image before an operation is performed on a touch panel, thereby improving operability.

On the other hand, a visual line direction detecting apparatus has been suggested (Patent Document 3) in which visual lines of both eyes of a driver are detected, a comparison is made between the detection results and a standard visual line movement pattern in a normal driving state according to the state of a road where a vehicle has traveled during a detection period, it is determined which of the visual lines of both eyes is similar to the visual line movement pattern, and then an eye with a visual line direction more similar to the visual line movement pattern is determined as a dominant eye.

CITATION LIST

Patent Literature

PTL 1: Japanese Patent Application Laid-Open No. 10-105735
PTL 2: Japanese Patent Application Laid-Open No. 2004-280496
PTL 3: Japanese Patent Application Laid-Open No. 2006-293909

SUMMARY OF INVENTION

Technical Problem

As shown in (A) of FIG. 28, when a stereoscopic display object is touched for operation, a place of the stereoscopic display object thought to have been touched is actually a position corresponding to the stereoscopic display object on either one viewpoint image of a left viewpoint image ((B) of FIG. 28) and a right viewpoint image ((C) of FIG. 28). Which of the corresponding point on the left viewpoint image and the corresponding point on the right viewpoint image is near the place touched on the stereoscopic display object depends on the dominant eye of the user. It has been known that, for a person whose dominant eye is the right eye, a place of the stereoscopic display object (a 3D image) thought to have been touched and a place of the right viewpoint image (a 2D image) match or are very near each other. Similarly, it has been known that, for a person whose dominant eye is the left eye, a place of the stereoscopic display object (a 3D image) thought to have been touched and a place of the left viewpoint image (a 2D image) match or are very near each other.

In the invention disclosed in Patent Document 1, no consideration is given at all to the fact that a positional deviation occurs in touched position due to the dominant eye of the user when a stereoscopic display object is operated on a touch panel.

In the invention disclosed in Patent Document 2, switching is made to a flat image (a 2D image) before an operation is performed on the touch panel, and therefore it is not assumed to operate the touch panel on a stereoscopic image.

On the other hand, while Patent Document 3 describes that the dominant eye of the driver is determined by using visual line direction detecting means detecting visual line directions of both eyes of the driver, the visual line direction detecting means and others are required, and therefore the dominant eye cannot be determined with ease.

The present invention was made in view of the circumstances described above, and has an object of providing a stereoscopic display apparatus and stereoscopic shooting apparatus, dominant eye judging method and dominant eye judging program for use therein, and recording medium in which the dominant eye of the user can be judged with ease by using a stereoscopic display apparatus, position coordinates on a stereoscopic display screen intended by the user can be obtained by using the judgment result, and operability at a coordinate position input device such as a touch panel can be improved.

Solution to Problems

To achieve the object described above, a stereoscopic display apparatus according to a first aspect of the present invention includes a stereoscopic display part displaying a stereoscopic image formed of a left viewpoint image and a right viewpoint image, a coordinate input part inputting desired position coordinate on a display surface of the stereoscopic display part, a display control part causing the stereoscopic display part to display a dominant eye judgment image formed of a left viewpoint image and a right viewpoint image for judging a dominant eye of a user, the dominant eye judgment image representing different reference coordinates between the left viewpoint image and the right viewpoint image, an obtaining part obtaining the position coordinates inputted by the user via the coordinate input part for the dominant eye judgment image displayed on the stereoscopic display part, and a judging part judging the dominant eye of the user inputting the position coordinates via the coordinate input part based on the reference coordinates of the dominant eye judgment image formed of the left viewpoint image and the right viewpoint image and the obtained position coordinates, depending on whether the obtained position coordinates are near the reference coordinates of the left viewpoint image or the reference coordinates of the right viewpoint image.

When position coordinates are inputted by the user via the coordinate input part for the dominant eye judgment image stereoscopically displayed on the stereoscopic display part, the inputted position coordinates are obtained via the coordinate input part. Based on these obtained position coordinates and reference coordinates of the dominant eye judgment image, the dominant eye of the user is judged depending on whether "the obtained position coordinates are near reference coordinates of the left viewpoint image and reference coordinates of the right viewpoint image." This is based on the fact that "the position coordinates inputted on the dominant eye judgment image formed of the left viewpoint image and the right viewpoint image are near the reference coordinates of the user's dominant-eye-side viewpoint image."

In the stereoscopic display apparatus according to a second aspect of the present invention, in the stereoscopic display apparatus according to the first aspect, the display control part causes the stereoscopic display part to display an icon image for operation as the dominant eye judgment image. According to this, when a normal icon image is clicked for operation, a dominant eye judgment can be automatically performed inside the apparatus without letting the user be aware of the dominant eye judgment at all, and the judgment result can be utilized for another control.

In the stereoscopic display apparatus according to a third aspect of the present invention, in the stereoscopic display apparatus according to the first aspect, the display control part causes the stereoscopic display part to display a button image such as a start button or a login button as the dominant eye judgment image. The user performs a touch operation on the button image displayed on the stereoscopic display part without being aware of the dominant eye judgment. Therefore, in the stereoscopic display apparatus according to the third aspect, a dominant eye judgment can be automatically performed inside the apparatus without letting the user be aware of the dominant eye judgment at all. Note that as the button image, for example, a button that is inevitably touched is preferable, such as a start button or a login button.

In the stereoscopic display apparatus according to a fourth aspect of the present invention, in the stereoscopic display apparatus according to the first aspect, the display control part causes the stereoscopic display part to display a slide bar image including a knob for operation as the dominant eye judgment image. With the position where the knob of the slide bar is touched, a user's dominant eye judgment can be made.

In the stereoscopic display apparatus according to a fifth aspect of the present invention, in the stereoscopic display apparatus according to the first aspect, the display control part causes the stereoscopic display part to display a line drawing as the dominant eye judgment image, and the judging part judges the dominant eye of the user tracing the line drawing based on an average distance between coordinates of each contour line of the dominant eye judgment image formed of the left viewpoint image and the right viewpoint image representing the line drawing and coordinates successively obtained by the coordinate input part by tracing the line drawing. The line drawing displayed on the stereoscopic display part is traced and, depending on the traced track is near the line drawing of the left viewpoint image or near the line drawing of the right viewpoint image, the user's dominant eye is judged. Note that as the line drawing, a picture, graph, or the like that can be easily traced is preferable.

In the stereoscopic display apparatus according to a sixth aspect of the present invention, in the stereoscopic display apparatus according to the first aspect, the display control part causes the stereoscopic display part to display a unfinished picture or graphic as the dominant eye judgment image, and based on reference coordinates of the dominant eye judgment image formed of the left viewpoint image and the right viewpoint image representing the unfinished picture or graphic and position coordinates of a picture or graphic added to finish the unfinished picture or graphic by the coordinate input part, the judging part judges the dominant eye of the adding user. The user's dominant eye is judged depending on whether the position coordinates of the picture or graphic added to the unfinished picture or graphic of the left viewpoint image and the right viewpoint image are near the left viewpoint image or the right viewpoint image.

In the stereoscopic display apparatus according to a seventh aspect of the present invention, in the stereoscopic display apparatus according to any one of the first to sixth aspects, the judging part judges a right eye as the dominant eye when the dominant eye of the user inputting the position coordinates via the coordinate input part cannot be judged. That is, if a dominant eye judgment cannot be made, since people with the right eye as the dominant eye are more than people with the left eye as the dominant eye, the right eye is judged as the dominant eye, thereby reducing an error in judgment as much as possible.

The stereoscopic display apparatus according to an eighth aspect of the present invention, in the stereoscopic display apparatus according to any one of the first to seventh aspects, includes a storing and registering part storing and registering information about the dominant eye of the user inside the apparatus. The information about the dominant eye of the user can be registered in the apparatus, thereby eliminating the need of judging the dominant eye every time.

In the stereoscopic display apparatus according to a ninth aspect of the present invention, in the stereoscopic display apparatus according to the eighth aspect, the storing and registering part automatically stores and registers the information about the dominant eye based on the judgment result by the judging part.

In the stereoscopic display apparatus according to a tenth aspect of the present invention, in the stereoscopic display apparatus according to the eighth or ninth aspect, the storing and registering part has a dominant eye information input part accepting information about the dominant eye of the user indicated and inputted from the user, and stores and registers the information about the dominant eye of the user accepted by the dominant eye information input part.

According to the ninth or tenth aspect, the information about the dominant eye of the user can be automatically registered, or the user can determine his or her own dominant eye and register the dominant eye.

The stereoscopic display apparatus according to an eleventh aspect of the present invention, in the stereoscopic display apparatus according to any one of the eighth to tenth aspects, includes a position input part accepting, via the coordinate input part, position coordinates of a desired target image on the stereoscopic image displayed on the stereoscopic display part, wherein the position coordinates accepted from the position input part are handled as a coordinate position on a dominant-eye-side viewpoint image from out of the left viewpoint image and the right viewpoint image of the stereoscopic image, the dominant-eye-side viewpoint image corresponding to the information about the dominant eye of the user registered in the storing and registering part. With this, a deviation between the position coordinates intended by the user and position coordinates on the viewpoint image determined by the device side can be reduced, thereby improving operability of the coordinate input part.

In the stereoscopic display apparatus according to a twelfth aspect of the present invention, in the stereoscopic display apparatus according to any one of the first to eleventh aspects, the coordinate input part is a touch panel provided on the display surface of the stereoscopic display part.

The stereoscopic display apparatus according to a thirteenth aspect of the present invention, in the stereoscopic display apparatus according to any one of the eighth to twelfth aspects, includes a display mode switching part switching between a 3D display mode for causing the stereoscopic display part to display the stereoscopic image formed of the left viewpoint image and the right viewpoint image and a 2D display mode for causing the stereoscopic display part to display either one viewpoint image from out of the left viewpoint image and the right viewpoint image configuring the stereoscopic image, wherein at the time of switching by the display mode switching part to the 2D display mode, the display control part causes the stereoscopic display part to display a user's dominant-eye-side viewpoint image from out of the left viewpoint image and the right viewpoint image based on the information about the dominant eye of the user registered in the storing and registering part.

With this, viewability at the time of display switching from the stereoscopic image (the 3D image) to either one viewpoint image (the 2D image) of the left viewpoint image and the right viewpoint image can be improved.

In the stereoscopic display apparatus according to a fourteenth aspect of the present invention, in the stereoscopic display apparatus according to the thirteenth aspect, the coordinate input part is a touch panel provided on the display surface of the stereoscopic display part, and the display mode switching part alternately switches among the 2D display mode and the 3D display mode every time a touch is detected by the touch panel. With this, switching can be easily made between the 2D display mode and the 3D display mode.

In the stereoscopic display apparatus according to a fifteenth aspect of the present invention, in the stereoscopic display apparatus according to the thirteenth aspect, the coordinate input part is a touch panel provided on the display surface of the stereoscopic display part, and the display mode switching part switches to the 2D display mode when a touch is detected by the touch panel, and switches to the 3D display mode when a touch is not detected by the touch panel or a touch is not detected for a predetermined period of time or more. With this, if the touch panel is being continuously touched or the touch panel is successively operated without a predetermined time interval or more, only the dominant-eye-side viewpoint image (the 2D image) is displayed, thereby improving operability.

The stereoscopic display apparatus according to a sixteenth aspect of the present invention, in the stereoscopic display apparatus according to any one of the eighth to fifteenth aspects, includes a parallax amount detecting part detecting parallax amounts of left and right of the stereoscopic image formed of the left viewpoint image and the right viewpoint image to be displayed on the stereoscopic display part, a region extracting part extracting a region having a parallax amount exceeding a parallax amount previously set or a parallax amount of a region appearing doubled and specified by the user from out of the parallax amounts detected by the parallax amount detecting part, and a image replacing part replacing a stereoscopic image of the region extracted by the region extracting part only by the user's dominant-eye-side viewpoint image corresponding to the information about the dominant eye of the user and registered in the storing and registering part.

There are some cases in which a region with a large parallax amount appears doubled in a stereoscopic image. Since a 2D image is better than an image that appears doubled, the region that appears doubled is replaced by a dominant-eye-side viewpoint image (the 2D image). Here, the region to be replaced by a 2D image may be automatically extracted as a region with a parallax amount exceeding a predetermined parallax amount, or the region that appears doubled from the user may be specified by the coordinate input part.

A stereoscopic imaging apparatus according to a seventeenth aspect of the present invention, in a stereoscopic shooting apparatus including the stereoscopic display apparatus according to any one of the eighth to sixteenth aspects, includes a shooting mode switching part switching between a 2D shooting mode for shooting a two-dimensional image and a 3D shooting mode for shooting a stereoscopic image formed of a left viewpoint image and a right viewpoint image, and a control part causing the stereoscopic display part to display the user's dominant-eye-side viewpoint image corresponding to the information about the dominant eye of the user and registered in the storing and registering part from out of the left viewpoint image and the right viewpoint image when switching is made by the shooting mode switching part to the 2D shooting mode.

According to this, it becomes easy to shoot a 2D image in 2D shooting mode by the stereoscopic shooting apparatus. Also, a photographer is less prone to be fatigued with the dominant eye and can obtain more information amount.

An eighteenth aspect of the present invention is directed to a dominant eye judging method using a stereoscopic display apparatus having a stereoscopic display part and a coordinate input part inputting desired position coordinates on a display surface of the stereoscopic display part, the method including the steps of causing the stereoscopic display part to display a dominant eye judgment image formed of a left viewpoint image and a right viewpoint image for judging a dominant eye of a user, the dominant eye judgment image representing different reference coordinates between the left viewpoint image and the right viewpoint image, obtaining position coordinates inputted by the user via the coordinate input part for the dominant eye judgment image displayed on the stereoscopic display part, and a judging part judging the dominant eye of the user inputting the position coordinates via the coordinate input part based on the reference coordinates of the dominant eye judgment image formed of the left viewpoint image and the right viewpoint image and the obtained position coordinates, depending on whether the obtained position coordinates are near the reference coordinates of the left viewpoint image or the reference coordinates of the right viewpoint image.

A nineteenth aspect of the present invention provides a program causing the stereoscopic display apparatus to execute the dominant eye judging method according to the eighteenth aspect.

A twentieth aspect of the present invention provides a recording medium having a computer-readable code of the program according to the nineteenth aspect recorded thereon.

Advantageous Effects of Invention

According to the present invention, only with instruction and input of desired position coordinates by the user for the dominant eye judgment image for dominant eye judgment stereoscopically displayed on the stereoscopic display part, the user's dominant eye can be easily judged. Also, by using this judgment result, user-intended position coordinates can be obtained when desired position coordinates on the stereoscopic image are inputted, thereby improving operability in the coordinate input part such as a touch panel.

DESCRIPTION OF EMBODIMENTS

Embodiments of the stereoscopic display apparatus and stereoscopic shooting apparatus, dominant eye judging method and dominant eye judging program for use therein, and recording medium according to the present invention are described below in accordance with the attached drawings.

First Embodiment

Figure 1:
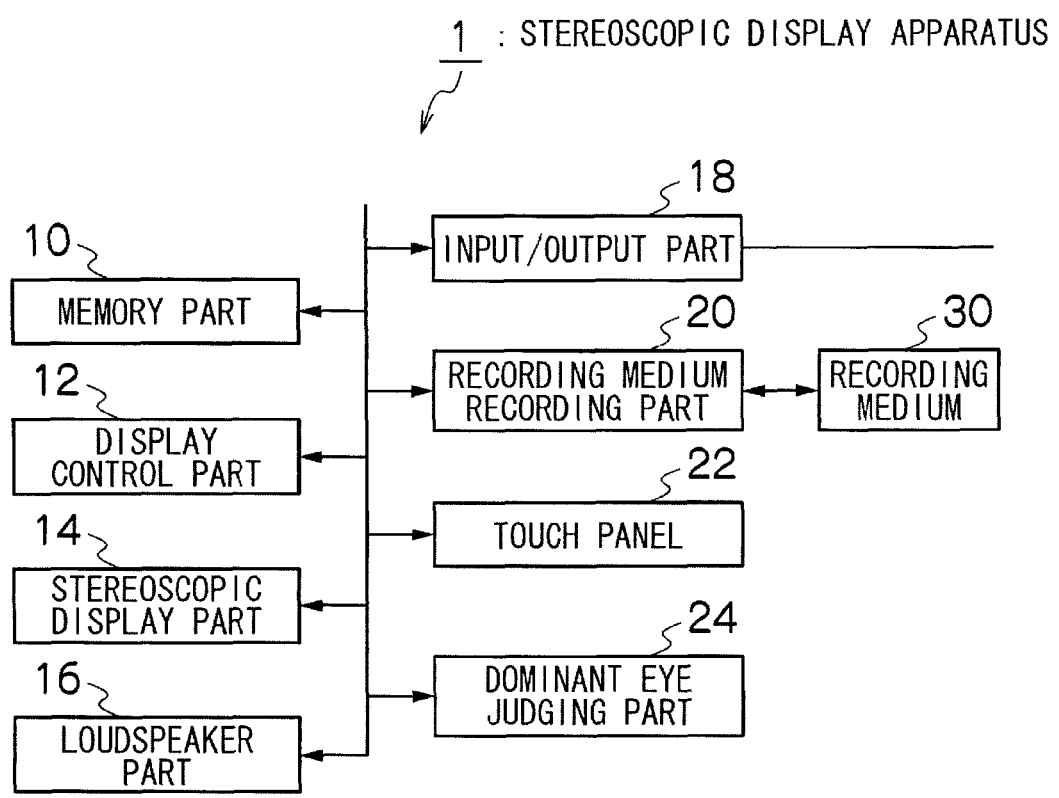
FIG. 1 is a block diagram showing a first embodiment of a stereoscopic display apparatus according to the present invention.

FIG. 1 is a block diagram showing a first embodiment of the stereoscopic display apparatus according to the present invention. As shown in FIG. 1, this stereoscopic display apparatus 1 is configured mainly of a memory part 10, a display control part 12, a stereoscopic display part 14, a loudspeaker part 16, an input/output part 18, a recording medium recording part 20, a touch panel 22, and a dominant eye judging part 24.

The memory part 10 includes a flash memory, a RAM, and others, storing a dominant eye judging program according to the present invention, firmware, dominant eye judgement image formed of a left viewpoint image and a right viewpoint image for judging a dominant eye user's dominant eye information, reference coordinates of each dominant eye judgment image, and user's dominant eye information and functions as a memory temporarily storing image data for display to be displayed on the stereoscopic display part 14. Note that the dominant eye judging program and others for use may be those stored in an HDD or a magneto-optical recording medium such as a CD/DVD/BD or the like.

The display control part 12 is a portion that causes the stereoscopic display part 14 to display images such as a dominant eye judgement image for judging a dominant eye, a stereoscopic image (a 3D image), a dominant-eye-side viewpoint image (a 2D image), a normal 2D image, and others including an image for GUI or the like, and can be a central processing unit (CPU), for example.

The stereoscopic display part 14 is a liquid-crystal monitor capable of displaying two viewpoint images (a left viewpoint image and a right viewpoint image) with a parallax barrier as objective images each having a predetermined directivity. Note that as the stereoscopic display part 14, a part using a lenticular lens or a part allowing the left viewpoint image and the right viewpoint image to be individually viewed by wearing dedicated eyeglasses such as liquid-crystal shutter eyeglasses can be applied.

The loudspeaker part 16 generates audio based on audio data at the time of replaying an audio-attached image (a still picture or a moving picture). The input/output part 18 is an interface inputting and outputting information such as image data to and from an external device such as a personal computer. The recording medium recording part 20 reads and writes image data from and to the removable recording medium 30 such as a memory card.

The touch panel 22 is provided on a display surface of the stereoscopic display part 14 and, when a user touches an arbitrary position on the touch panel 22, two-dimensional coordinate data of that touched position is sent to the dominant eye judging part 24 and a stereoscopic touched position coordinate determining part 26.

The dominant eye judging part 24 judges a dominant eye of the user touching the touch panel 22, based on the coordinate data of the touched position obtained from the touch panel 22 at the time of judging a dominant eye. Note that details of this dominant eye judgement are described further below.

Figure 2:
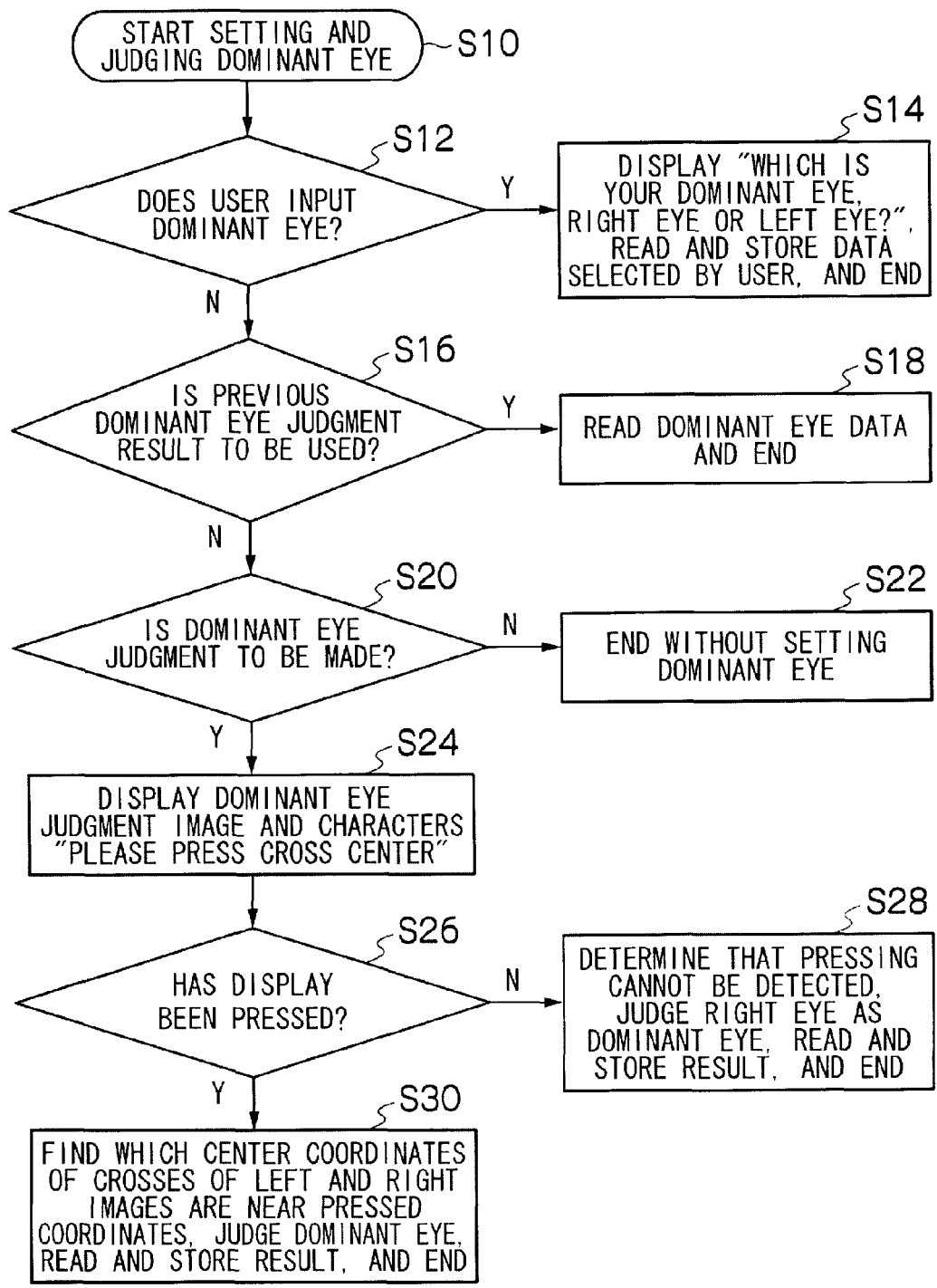
FIG. 2 is a flowchart showing a dominant eye judging process and storage and registration of dominant eye information.

FIG. 2 is a flowchart showing a dominant eye judging process and storage and registration of dominant eye information. The dominant eye judging method, dominant eye judging program, and others according to the present invention are described below in accordance with the flowchart shown in FIG. 2.

[Step S10]

Dominant eye setting and judgement are started. While it is ideal, in practice, to judge a dominant eye in a process of a touch panel operation by the user when the stereoscopic display apparatus 1 is started up or when a start button is operated or date setting is performed, for example, dominant eye judgement may be started by selecting a menu of dominant eye setting and judgement.

[Step S12]

When dominant eye setting and judgement are started, the display control part 12 first causes the stereoscopic display part 14 to display a screen on which it is selected whether to input information about the dominant eye by the user. Here, when the user inputs information about the dominant eye via the touch panel 22 (in the case of "Yes"), the procedure makes a transition to step S14. When the user does not input that information (in the case of "No"), the procedure makes a transition to step S16.

[Step S14]

The display control part 12 causes the stereoscopic display part 14 to display "which is your dominant eye, the right eye or the left eye?", prompting the user to select the dominant eye. When the user selects his or her dominant eye, information about the selected dominant eye is read and stored in the memory part 10 or the recording medium recording part 30, and the procedure ends.

[Step S16]

The display control part 12 causes the stereoscopic display part 14 to display a screen on which it is selected whether to use the previous dominant eye judgement result or the stored information about the dominant eye. When the previous or stored information about the dominant eye is used, the procedure makes a transition to step S18. When not used, the procedure makes a transition to step S20.

[Step S18]

The dominant eye information is read from the memory part 10 or the recording medium 30, and the procedure ends.

[Step S20]

The display control part 12 causes the stereoscopic display part 14 to display a screen on which it is selected whether a dominant eye judgement is made. When a dominant eye judgement is not made, the procedure makes a transition to step S22. When a dominant eye judgement is made, the procedure makes a transition to step S24.

[Step S22]

The procedure ends without dominant eye setting.

[Step S24]

Figure 3:
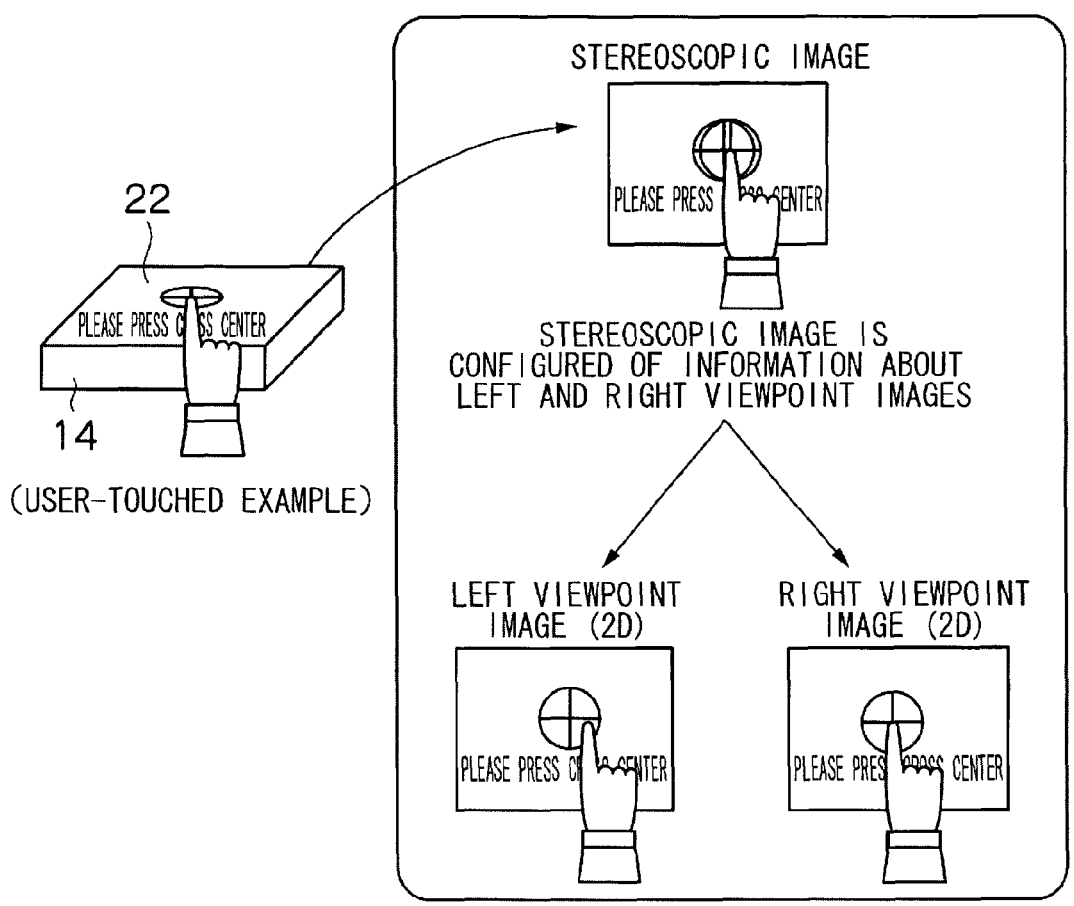
FIG. 3 is a diagram showing a dominant eye judgment image and the state of touching the dominant eye judgment image.

As shown in FIG. 3, the display control part 12 causes the stereoscopic display part 14 to display a dominant eye judgement image and characters "Please press the cross center."

This dominant eye judgement image is a stereoscopic image formed of a left viewpoint image and a right viewpoint image. In this embodiment, the stereoscopic image is a mark image with a circle having a cross therein. Note that the dominant eye judgment image and reference coordinates of each image (center coordinates of the cross) are stored in the memory part 10. Also, the dominant eye judgment image is not restricted to the one in this embodiment, and can be any as long as the image is an image with a parallax and can specify a place pressed by the user.

For example, one or plurality of icon images for operation displayed on the stereoscopic display part 14 may be used as a dominant eye judgement image. According to this, while an operation of touching or clicking an icon image or the like is being performed, a dominant eye judgement can be automatically performed inside.

[Step S26]

The dominant eye judging part 24 detects whether the dominant eye judgement image on the screen of the stereoscopic display part 14 has been pressed (whether the touch panel 22 has been touched). If the image has not been pressed for a predetermined time or more (in the case of "No"), the procedure makes a transition to step S28. If the image has been pressed (in the case of "Yes"), the procedure makes a transition to step S30.

[Step S28]

Determining that it cannot be detected that the dominant eye judgement image has been pressed, the dominant eye judging part 24 judges the right eye as the dominant eye and reads the judgement result for storage in the memory part 10 or the recording medium 30, and the procedure ends. The reason for this is that, since people with the right eye as the dominant eye are more than people with the left eye as the dominant eye, the right eye is taken as the dominant eye, thereby reducing an error in judgement as much as possible.

[Step S30]

The dominant eye judging part 24 obtains, via the touch panel 22, position coordinates where the dominant eye judgement image has been pressed, and judges the user's dominant eye based on these position coordinates and the reference position of each of the left viewpoint image and the right viewpoint image of the dominant eye judgement image.

Figure 4:
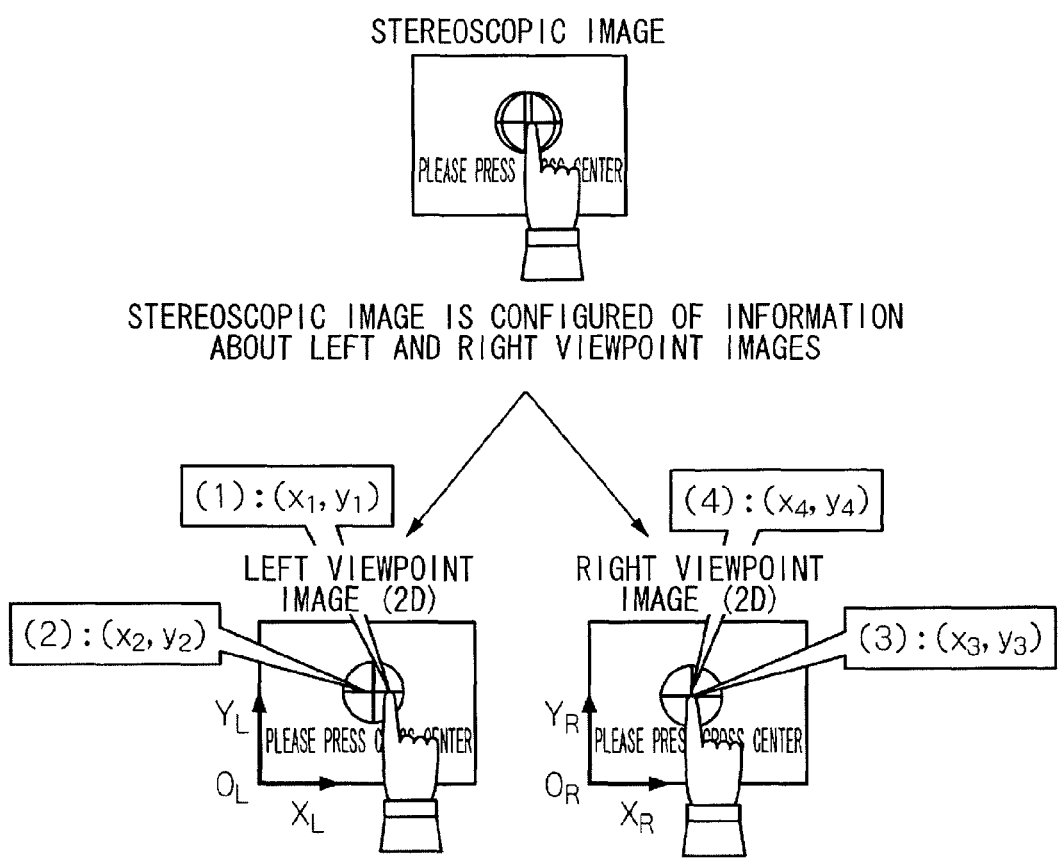
FIG. 4 is a diagram used for describing a method of computing a left viewpoint difference DL and a right viewpoint difference DR.

That is, a left viewpoint difference DL and a right viewpoint difference DR are calculated as shown in FIG. 4 and [Equation 1] and [Equation 2] below.

Left viewpoint difference $DL=|(1)$ pressed coordinates of the left viewpoint image$-((2)$ cross center of the left viewpoint image$)|$ $$DL=\sqrt{(x1-x2)^2+(y1-y2)^2} \quad \text{[Equation 1]}$$

Right viewpoint difference $DR=|(1)$ pressed coordinates of the right viewpoint image$-((2)$ cross center of the right viewpoint image$)|$ $$DR=\sqrt{(x3-x4)^2+(y3-y4))^2} \quad \text{[Equation 2]}$$

And, when DL<DR, the left eye is judged as the dominant eye. When DR≤DL, the right eye is judged as the dominant eye. Note that a dominant eye judgment cannot be made when DR=DL but, in this case, as with step S28, the right eye is judged as the dominant eye.

Information about thus judged user's dominant eye is stored in the memory part 10 or the recording medium 30, and the procedure ends.

With the use of the present method, a dominant eye judgement can be made only by touching the dominant eye judgement image displayed on the stereoscopic display part 14, and the result can be registered.

Second Embodiment

Figure 5:
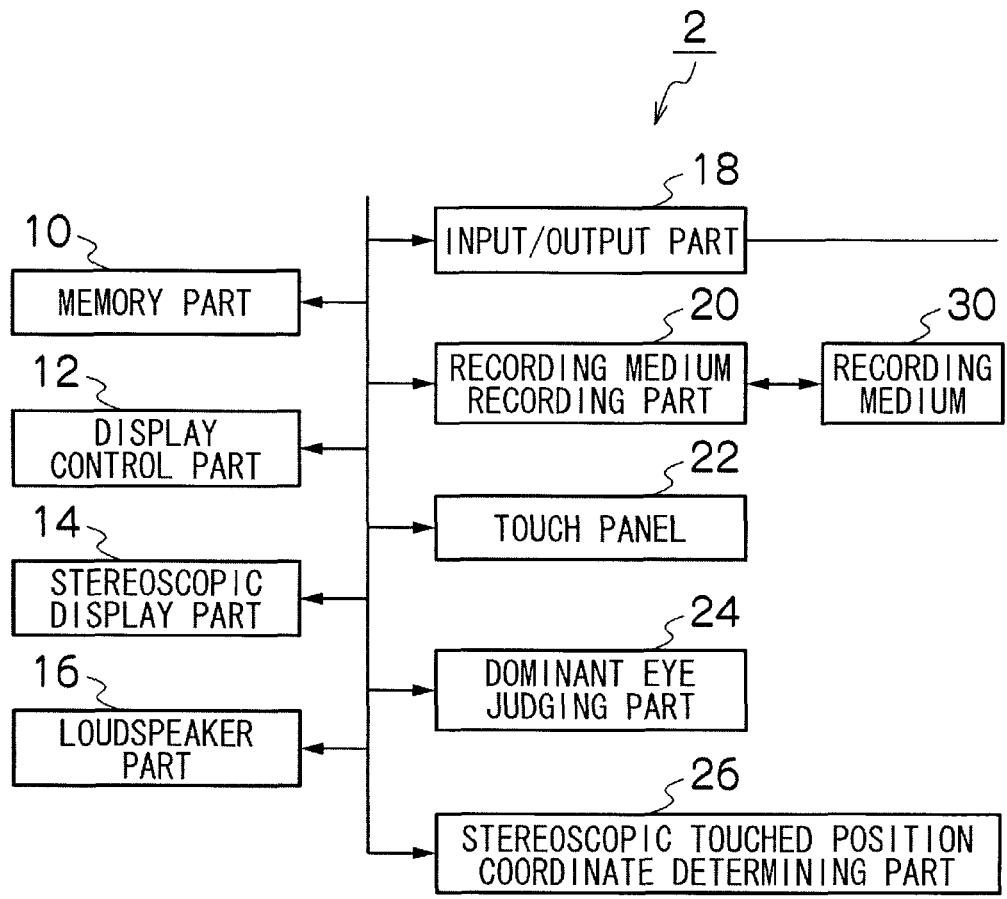
FIG. 5 is a block diagram showing a second embodiment of the stereoscopic display apparatus according to the present invention.

FIG. 5 is a block diagram showing a second embodiment of a stereoscopic display apparatus according to the present invention. Note that portions common to those in the first embodiment shown in FIG. 1 are provided with the same reference numerals and are not described in detail herein.

As shown in FIG. 5, a stereoscopic display apparatus 2 of the second embodiment is different from that of the first embodiment in that a stereoscopic touched position coordinate determining part 26 is added.

The stereoscopic touched position coordinate determining part 26 determines position coordinates on the stereoscopic image touched by the user, based on the information about the dominant eye of the user and the coordinate data of the touched position obtained from the touch panel 22.

Figure 6:
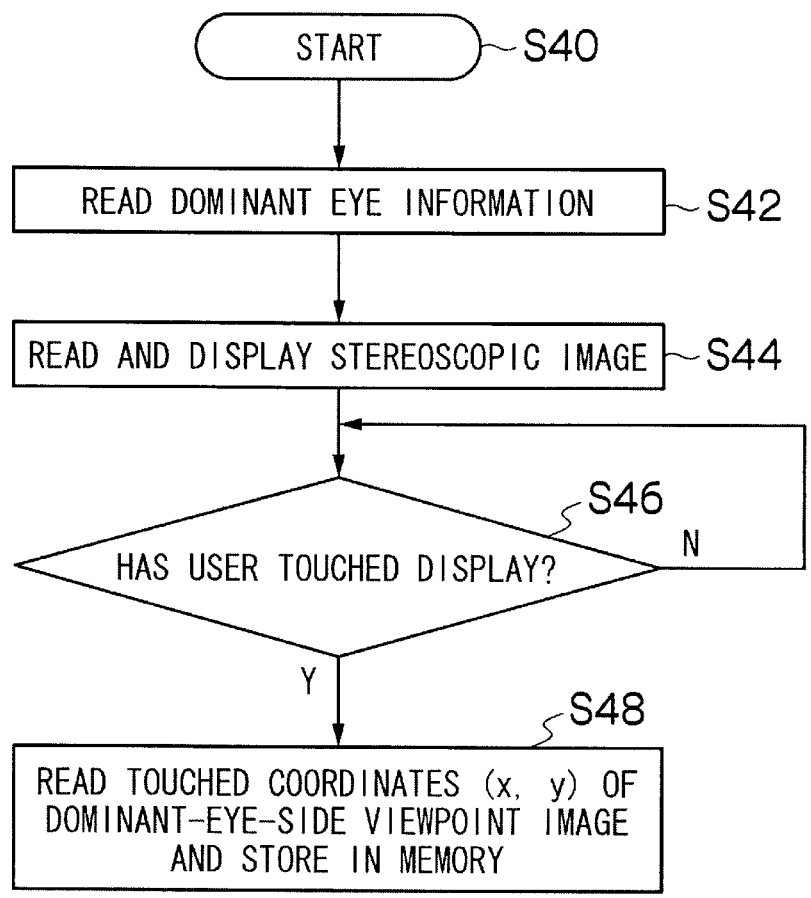
FIG. 6 is a flowchart showing a process procedure of determining position coordinates on a stereoscopic image touched by a user.

FIG. 6 is a flowchart showing a process procedure of determining position coordinates on a stereoscopic image touched by a user, and description is made below in accordance with the flowchart shown in FIG. 6.

[Step S40]

Stereoscopic display by the stereoscopic display apparatus 2 is started. Note that, at the start of stereoscopic display, as described above, dominant eye information of the user is assumed to be registered in the memory part 10 or the recording medium 30.

[Step S42]

The stereoscopic touched position coordinate determining part 26 reads the dominant eye information of the user registered in advance from the memory part 10 or the recording medium 30.

[Step S44]

The display control part 12 reads the stereoscopic image from the memory part 10 or the recording medium 30 or reads the stereoscopic image from the external device via the input/output part 18, and causes the stereoscopic display part 14 to display the read stereoscopic image.

[Step S46]

The user touches the touch panel 22 when operating the displayed stereoscopic image, and the stereoscopic touched position coordinate determining part 26 determines whether the user has touched the screen (the touch panel 22) of the stereoscopic display part 14. And, when it is detected that the screen has been touched, the procedure makes a transition to step S48.

[Step S48]

Coordinates (x, y) on the touched touch panel 22 are read as coordinates on the dominant-eye-side viewpoint image of the user in the displayed stereoscopic image, and are stored in the memory part 10.

Figure 7:
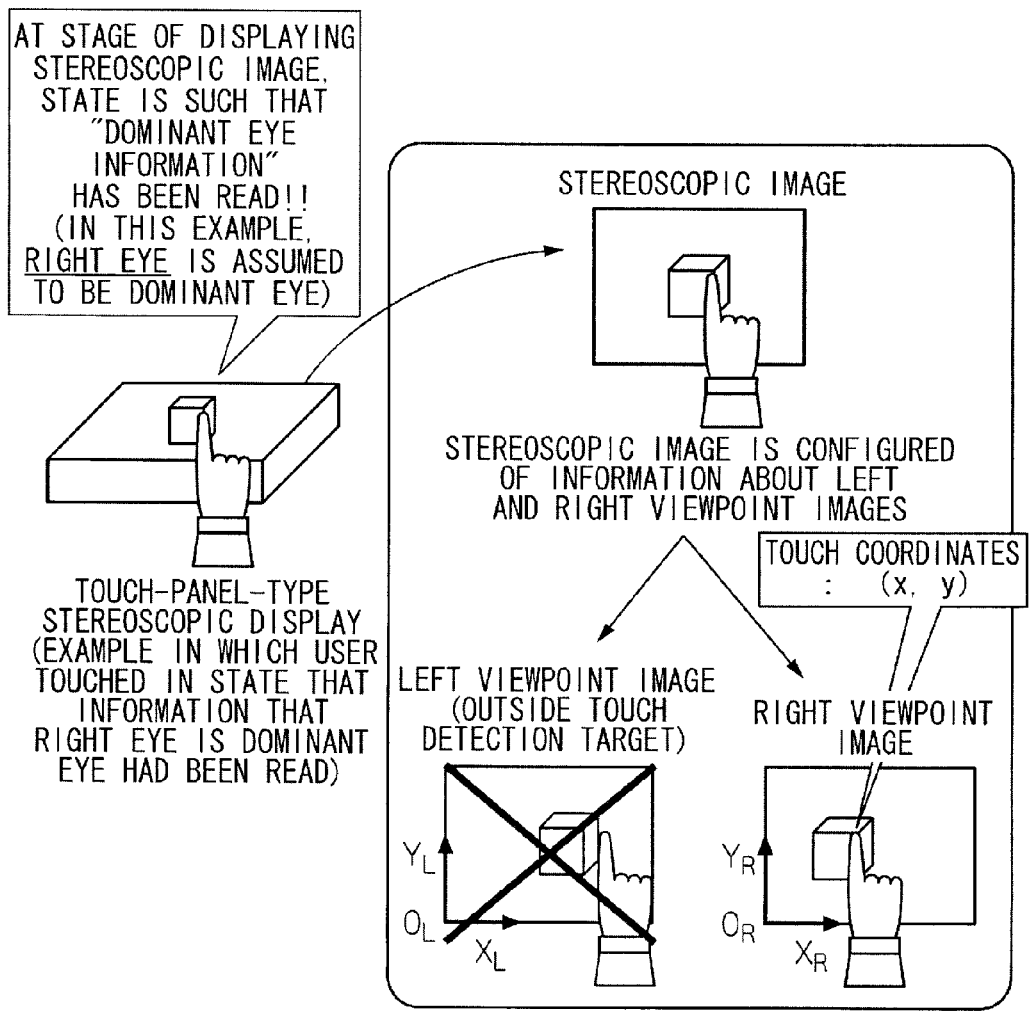
FIG. 7 is a diagram showing whether the position touched on the stereoscopic image is a position on a left viewpoint image or a position on a right viewpoint image.

That is, in the case where the dominant eye is the right eye as shown in FIG. 7, when an arbitrary position on the stereoscopic image (the left viewpoint image and the right viewpoint image) displayed on the stereoscopic display part 14 is touched, the touched coordinates (x, y) are dealt as coordinates on the right viewpoint image. With this, a deviation disappears or is reduced between a place thought by the user to be touched on the stereoscopic image and a place on the viewpoint image actually detected as a touched position, thereby improving operability of the stereoscopic image by the touch panel 22.

For example, when a subject is touched and the subject is subjected to zoom display, the zoom center can be correctly indicated. Also, when a soft button, various icons, and others, are stereoscopically displayed, an erroneous operation of the soft button and others can be prevented.

Third Embodiment

Figure 8:
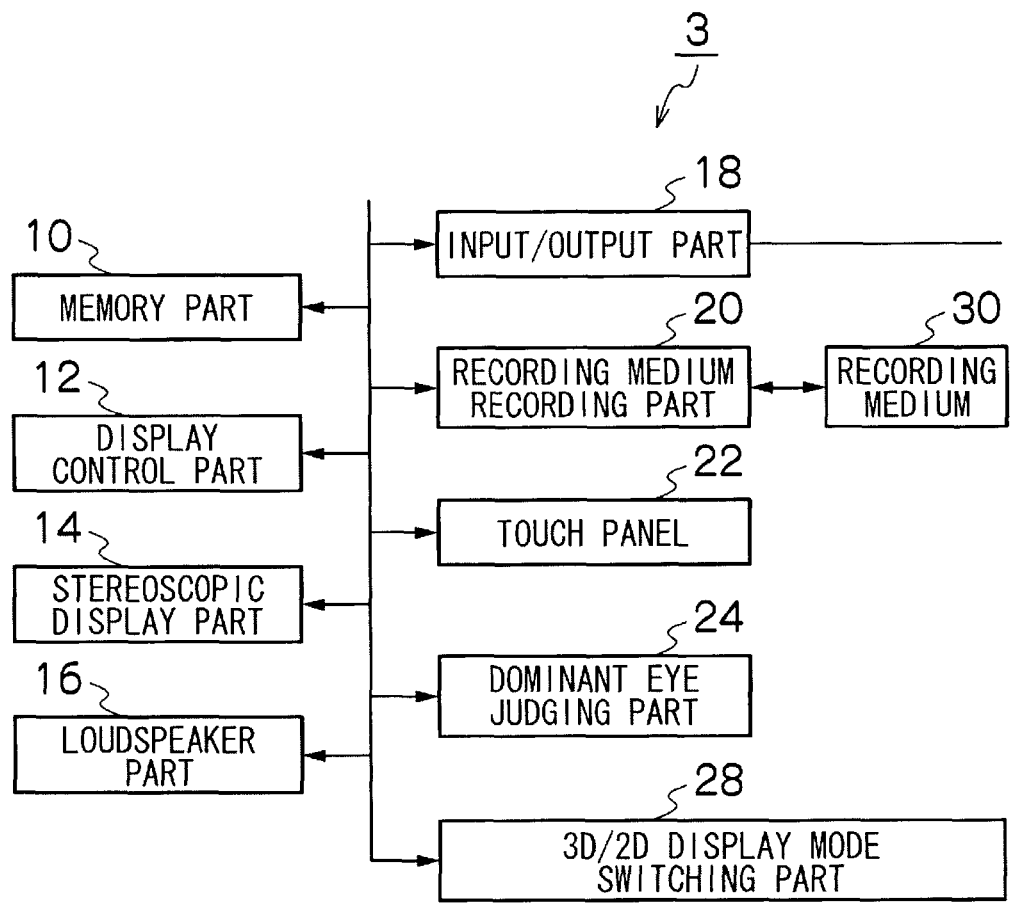
FIG. 8 is a block diagram showing a third embodiment of the stereoscopic display apparatus according to the present invention.

FIG. 8 is a block diagram showing a third embodiment of the stereoscopic display apparatus according to the present invention. Note that portions common to those in the first embodiment shown in FIG. 1 are provided with the same reference numerals and are not described in detail herein.

As shown in FIG. 8, a stereoscopic display apparatus 3 of the third embodiment is different from that of the first embodiment in that a 3D/2D display mode switching part 28 is added.

At the time of switching from a stereoscopic image (a 3D image) to a 2D image of a left viewpoint image or a right viewpoint image of that 3D image, the 3D/2D display mode switching part 28 makes an instruction for switching as to which of the left viewpoint image or the right viewpoint image is to be displayed, based on the user's dominant eye information.

Figure 9:
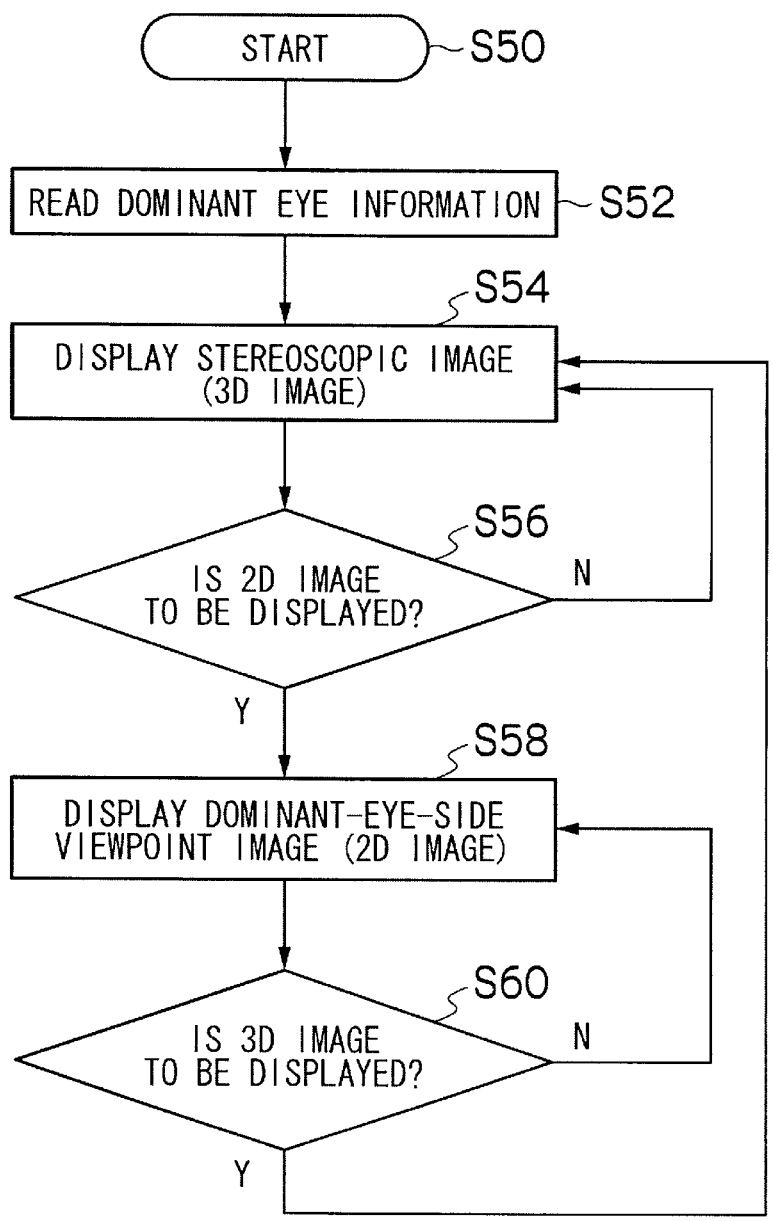
FIG. 9 is a flowchart showing a process procedure when switching is made from the state of displaying a stereoscopic image (a 3D image) to a 2D image of a left viewpoint image or a right viewpoint image.

FIG. 9 is a flowchart showing a process procedure when switching is made from the state of displaying a stereoscopic image (a 3D image) to a 2D image of a left viewpoint image or a right viewpoint image, and description is made below in accordance with the flowchart shown in FIG. 9.

Step S50

Stereoscopic display by the stereoscopic display apparatus 3 is started. Note that the memory part 10 or the recording medium 30 is assumed to have user's dominant eye information registered therein at the start of stereoscopic display.

[Step S52]

The 3D/2D display mode switching part 28 reads the user's dominant eye information registered in advance from the memory part 10 or the recording medium 30.

[Step S54]

The display control part 12 reads a stereoscopic image from the memory part 10 or the recording medium 30 or reads a stereoscopic image from an external device via the input/output part 18, and causes the stereoscopic display part 14 to display the read stereoscopic image (a 3D image).

[Step S56]

The user can press a display mode switch button, the touch panel 22, or the like not shown to make an instruction for switching from the stereoscopic image (the 3D image) to a 2D image of the left viewpoint image or the right viewpoint image. The display control part 12 discriminates whether an instruction by the user for switching from the 3D image to the 2D image is present, and causes the procedure to make a transition to step S54 when an instruction for switching to the 2D image is not present (in the case of "No") and to make a transition to step S58 when an instruction for switching to the 2D image is present (in the case of "Yes").

[Step S58]

For switching from the 3D image to the 2D image, the 3D/2D display mode switching part 28 causes the stereoscopic display part 14 to display a user's dominant-eye-side viewpoint image (a 2D image) based on the user's dominant eye information read at step S52 or provides the display control part 12 with an instruction as to which of the left viewpoint image and the right viewpoint image is to be displayed, and causes the stereoscopic display part 14 to display only the user's dominant-eye-side viewpoint image.

Figure 10:
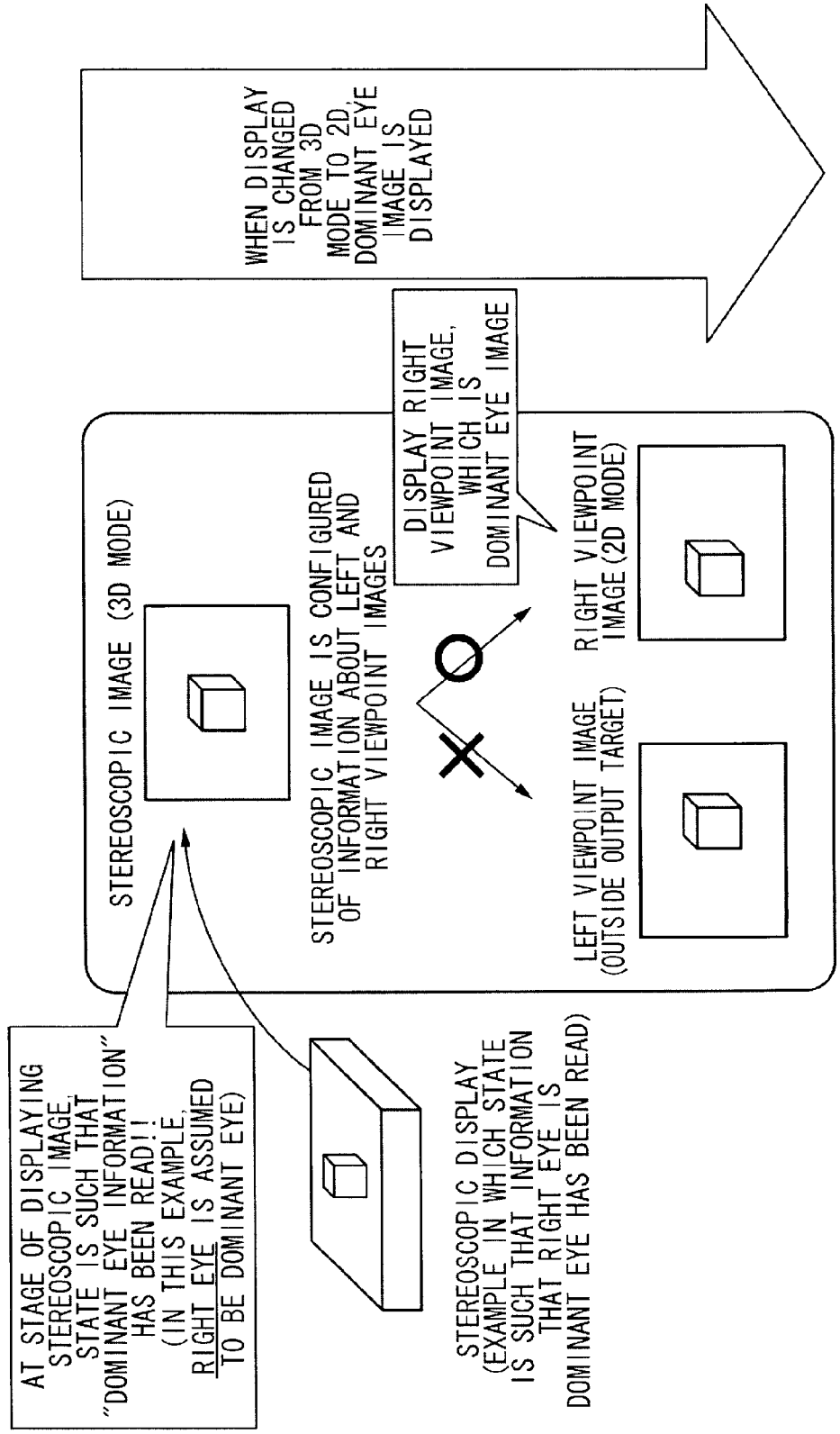
FIG. 10 is a diagram showing display switching from the state of displaying a stereoscopic image (a 3D image) to a user's dominant-eye-side viewpoint image (a 2D image)

As shown in FIG. 10, in the case where the dominant eye is the right eye, when switching is made from the stereoscopic image (the 3D image) displayed on the stereoscopic display part 14 to the 2D image of the left viewpoint image or the right viewpoint image, the right viewpoint image (the 2D image), which is the user's dominant-eye-side image, is displayed.

[Step S60]

The display control part 12 discriminates whether an instruction by the user for switching from the 2D image to the 3D image is present, and causes the procedure to make a transition to step S58 when an instruction for switching to the 3D image is not present (in the case of "No") and to make a transition to step S54 when an instruction for switching to the 2D image is present (in the case of "Yes").

With the use of the present method, when display is switched from the state of displaying the stereoscopic image (the 3D image) to the 2D image, uncomfortable feeling accompanying the switching of the display mode can be reduced to improve viewability.

Fourth Embodiment

Figure 11:
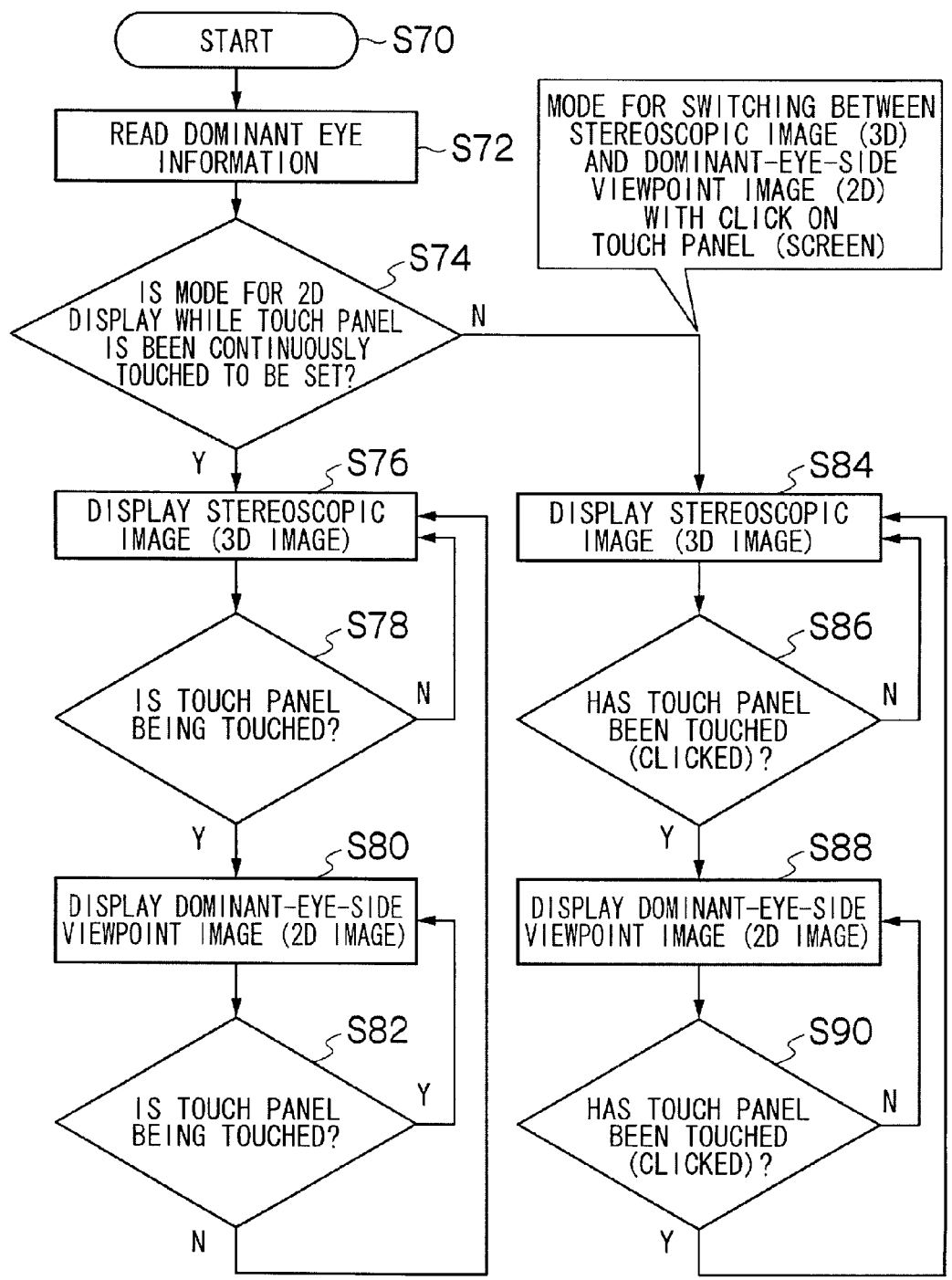
FIG. 11 is a flowchart showing a fourth embodiment of the present invention.

FIG. 11 is a flowchart showing a fourth embodiment of the present invention. Note that the structure of a stereoscopic display apparatus is identical to that of the third embodiment shown in FIG. 8, and is different therefrom only in process details as will be described below. Description is made below in accordance with the flowchart shown in FIG. 11.

[Step S70]

Stereoscopic display by the stereoscopic display apparatus is started. Note that the memory part 10 or the recording medium 30 is assumed to have user's dominant eye information registered therein at the start of stereoscopic display.

[Step S72]

The 3D/2D display mode switching part 28 reads the user's dominant eye information registered in advance from the memory part 10 or the recording medium 30.

[Step S74]

A discrimination is made as to whether to set a first mode for 2D display while the touch panel 22 is been continuously touched or a second mode for switching between 3D display and 2D display every time the touch panel 22 is touched. This discrimination can be performed by using a discrimination method based on a mode selecting operation by the user every time on a menu screen displayed on the stereoscopic display part 14 or a method of selecting and registering either one of the modes in advance and making a discrimination based on that registered mode.

When the first mode for 2D display at the time of continuous touching is selected (in the case of "Yes"), the procedure makes a transition to step S72. When the second mode for switching between 3D display and 2D display every time the touch panel 22 is touched is selected (in the case of "No"), the procedure makes a transition to step S84.

[Step S76]

The display control part 12 reads a stereoscopic image from the memory part 10 or the recording medium 30 or reads a stereoscopic image from an external device via the input/output part 18, and causes the stereoscopic display part 14 to display the read stereoscopic image (a 3D image).

[Step S78]

The display control part 12 discriminates whether the user is touching the touch panel 22 while the stereoscopic image (the 3D image) is being displayed. If the touch panel 22 is being touched (in the case of "Yes"), the procedure makes a transition to step S80. If not being touched (in the case of "No"), the procedure makes a transition to step S76.

[Step S80]

For switching from the 3D image to the 2D image, the 3D/2D display mode switching part 28 causes the stereoscopic display part 14 to display a user's dominant-eye-side viewpoint image (a 2D image) based on the user's dominant eye information read at step S72 or provides the display control part 12 with an instruction as to which of the left viewpoint image and the right viewpoint image is to be displayed, and causes the stereoscopic display part 14 to display only the user's dominant-eye-side viewpoint image.

[Step S82]

The display control part 12 discriminates whether the user is touching the touch panel 22 while the user's dominant-eye-side viewpoint image (the 2D image) is being displayed. If the touch panel 22 is being touched (in the case of "Yes"), the procedure makes a transition to step S80. If not being touched (in the case of "No"), the procedure makes a transition to step S76.

With this, during a period in which the user continuously operates the touch panel 22, the 2D image display is kept, thereby improving viewability and operability at the time of operation. Note that a determination "not touched" at step S82 is made not only when touching is not detected by the touch panel 22 but may be made when touching is not detected for a predetermined period or more. According to this, it is possible to switch to the 3D image during a series of touch panel operations.

[Step S84]

As with step S76, the display control part 12 reads a stereoscopic image from the memory part 10 or the recording medium 30 or reads a stereoscopic image from an external device via the input/output part 18, and causes the stereoscopic display part 14 to display the read stereoscopic image (a 3D image).

[Step S86]

The display control part 12 discriminates whether the user is touching (clicking) the touch panel 22 while the stereoscopic image (the 3D image) is being displayed. If the touch panel 22 is being clicked (in the case of "Yes"), the procedure makes a transition to step S88. If not being clicked (in the case of "No"), the procedure makes a transition to step S84.

[Step S88]

When the touch panel 22 is one-touched (one-clicked) during the stereoscopic image (the 3D image) display, the display control part 12 switches display from the stereoscopic image (the 3D image) displayed on the stereoscopic display part 14 to the user's dominant-eye-side viewpoint image (the 2D image).

Figure 12:
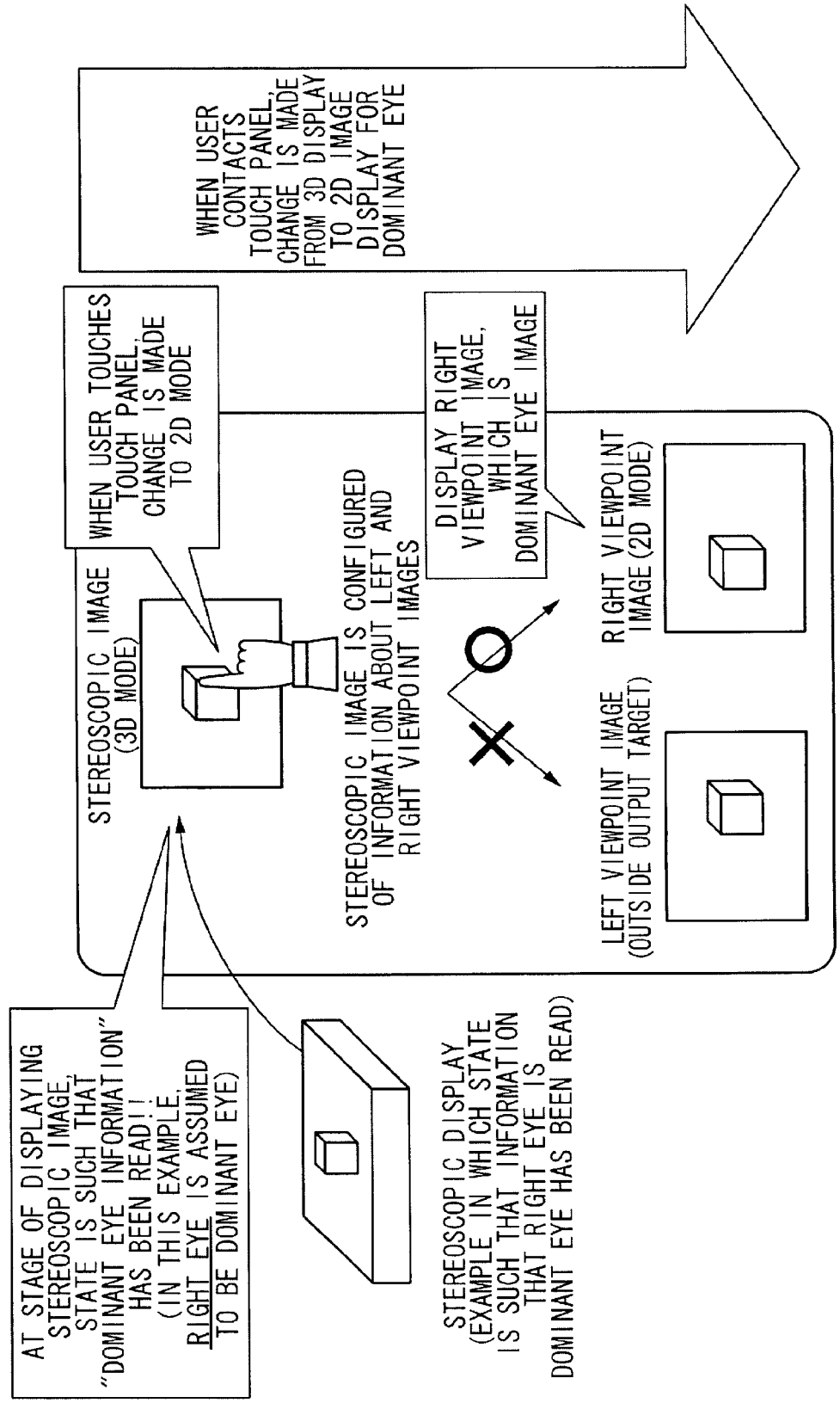
FIG. 12 is a diagram showing display switching between the state of displaying a stereoscopic image (a 3D image) according to the fourth embodiment of the present invention and a user's dominant-eye-side viewpoint image (a 2D image)

As shown in FIG. 12, in the case where the dominant eye is the right eye, with one touch on the touch panel 22, the dominant-eye-side right viewpoint image (the 2D image) can be displayed as being switched from the stereoscopic image (the 3D image).

[Step S90]

The display control part 12 discriminates whether the user has touched (clicked) the touch panel 22 while the user's dominant-eye-side viewpoint image (the 2D image) is being displayed. If the touch panel 22 has been clicked (in the case of "Yes"), the procedure makes a transition to step S84. If not been clicked (in the case of "No"), the procedure makes a transition to step S88.

With the use of the present method, the stereoscopic image (the 3D image) and the dominant-eye-side viewpoint image (the 2D image) can be alternately switched for display with one touch (one click) on the touch panel 22, thereby improving operability.

Fifth Embodiment

Figure 13:
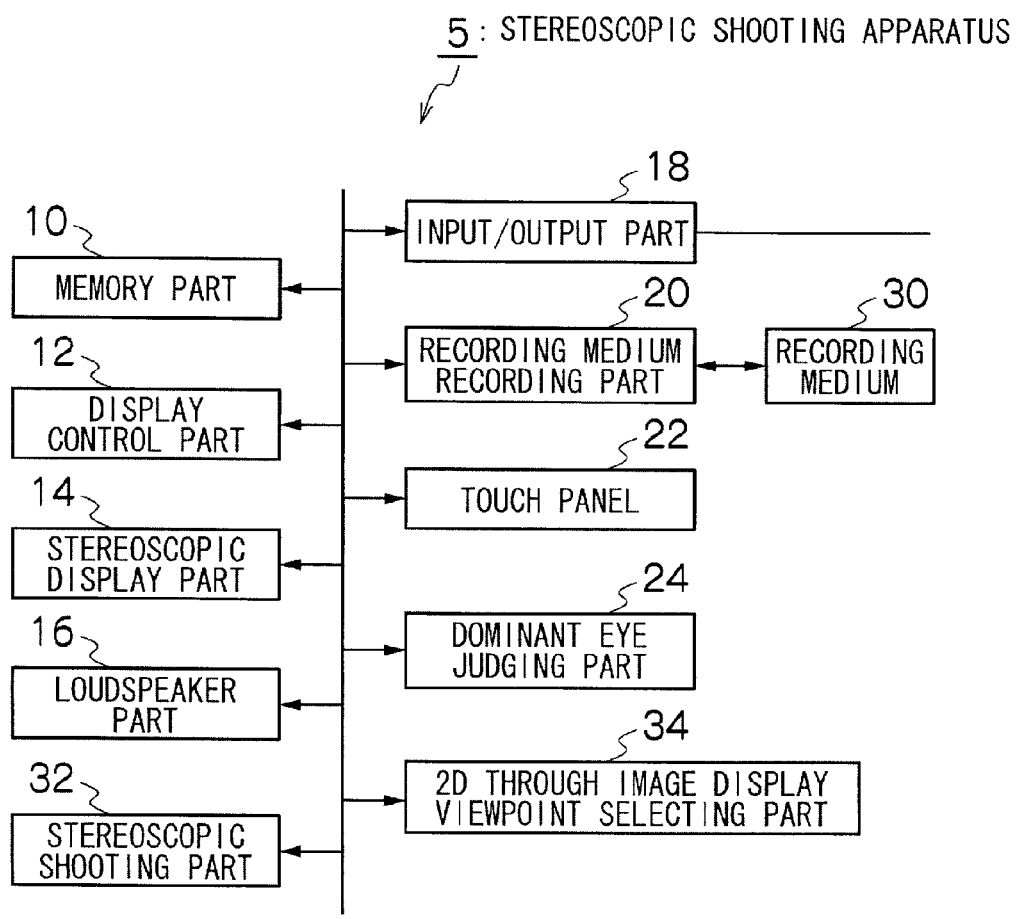
FIG. 13 is a block diagram showing an embodiment (a fifth embodiment) of a stereoscopic shooting apparatus according to the present invention.

FIG. 13 is a block diagram showing an embodiment (a fifth embodiment) of a stereoscopic shooting apparatus according to the present invention. Note that portions common to those in the first embodiment shown in FIG. 1 are provided with the same reference numerals and are not described in detail herein.

A stereoscopic shooting apparatus 5 shown in FIG. 13 is an apparatus having the stereoscopic display apparatus 1 shown in FIG. 1, and includes, in addition to the stereoscopic display apparatus 1 shown in FIG. 1, a stereoscopic shooting part 32 and a 2D through image display viewpoint selecting part 34.

The stereoscopic shooting part 32 is formed of, for example, paired left and right shooting parts capable of simultaneously shooting two viewpoint images (a left viewpoint image and a right viewpoint image), and the left viewpoint image and the right viewpoint image shot by this stereoscopic shooting part 32 are subjected to image processing as appropriate and are then recorded on the recording medium 30.

Figure 14:
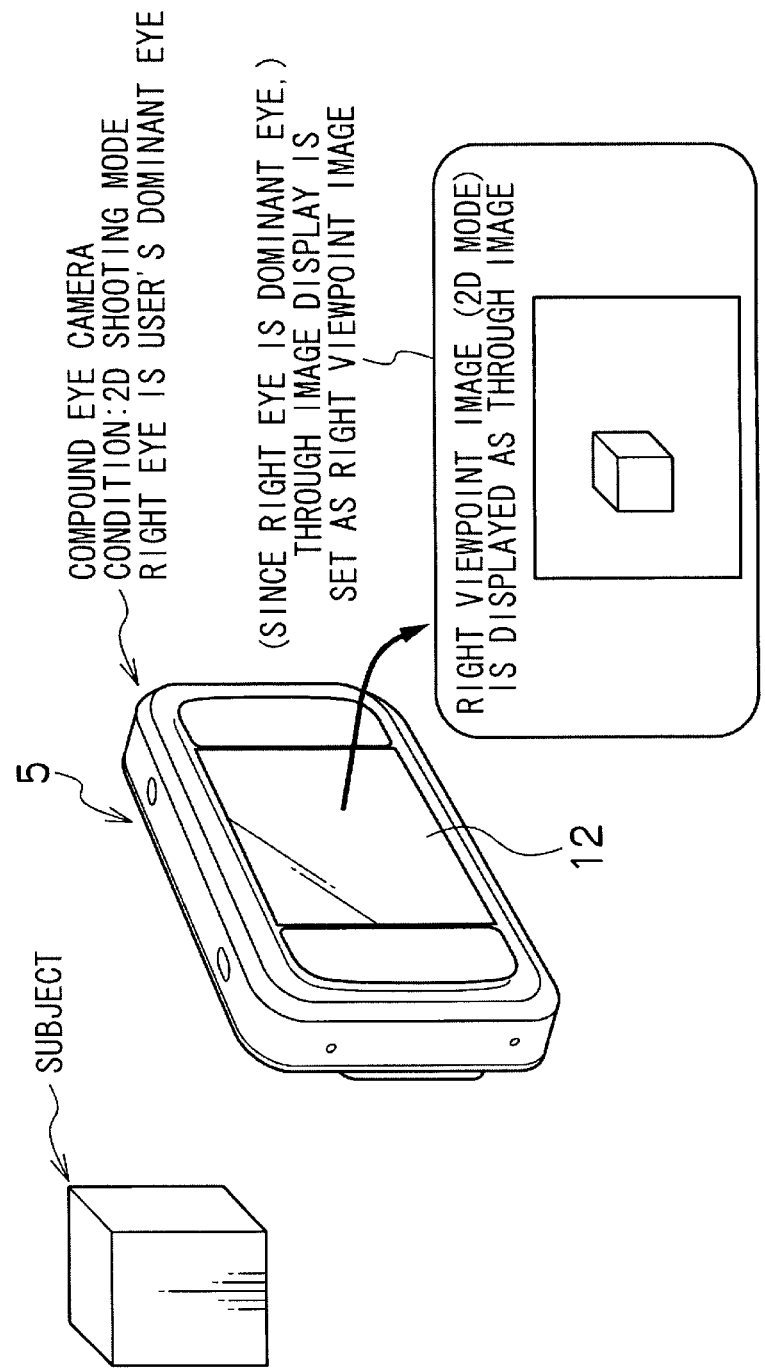
FIG. 14 is a diagram showing the stereoscopic shooting apparatus displaying a through image according to the fifth embodiment of the present invention.

The stereoscopic display part 14 is provided, as shown in FIG. 14, at the back surface of the stereoscopic shooting apparatus 5, functioning as a device for display at the time of replaying a stereoscopic image and also as a view finder at the time of shooting, displaying a 3D image or a 2D image (a through image) as moving pictures successively shot by the stereoscopic shooting part 32.

Also, this stereoscopic shooting apparatus 5 has a 3D shooting mode for shooting a stereoscopic image (a 3D image) and a 2D shooting mode for shooting a 2D image of the left viewpoint image or the right viewpoint image, and includes a shooting mode switching part for selecting from these shooting modes.

The 2D through image display viewpoint selecting part 34 makes an instruction for switching as to which of through images of viewpoint images, that is, the left viewpoint image or the right viewpoint image, is to be displayed at the time of switching from a through image of the stereoscopic image (the 3D image) to the through image of the 2D image of the left viewpoint image or the right viewpoint image.

Figure 15:
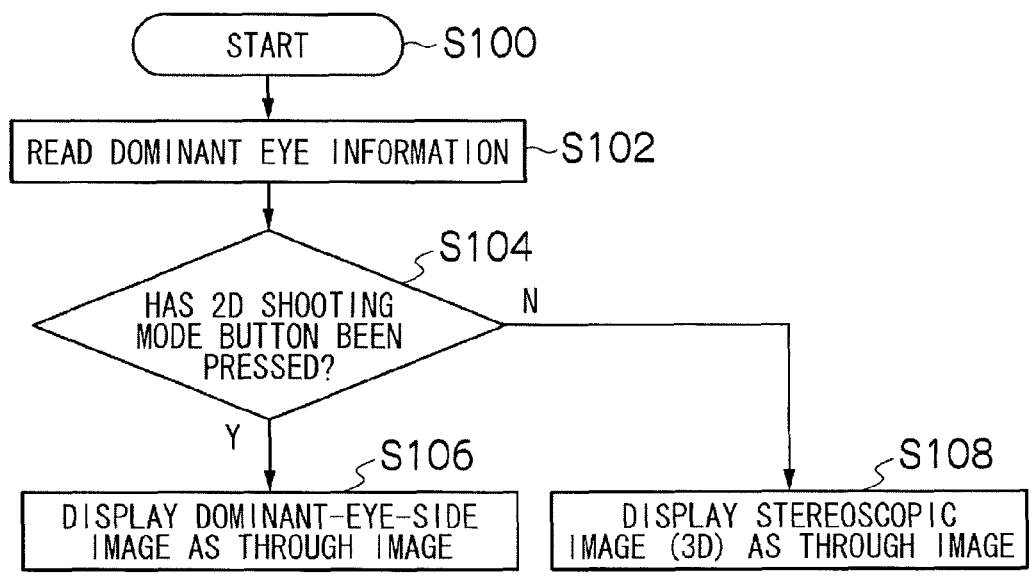
FIG. 15 is a flowchart showing a process procedure when a stereoscopic image or a 2D image is shot by the stereoscopic shooting apparatus.

FIG. 15 is a flowchart showing a process procedure when a stereoscopic image or a 2D image is shot by the stereoscopic shooting apparatus 5 described above. Description is made below in accordance with the flowchart shown in FIG. 15.

[Step S100]

Shooting of a through image by the stereoscopic shooting apparatus 5 is started. Note that the memory part 10 or the recording medium 30 is assumed to have user's dominant eye information registered therein at the start of shooting.

[Step S102]

The 2D through image display viewpoint selecting part 34 reads the user's dominant eye information registered in advance from the memory part 10 or the recording medium 30.

[Step S104]

The stereoscopic shooting apparatus 5 discriminates whether a shooting mode switching button for switching a 3D shooting mode to a 2D shooting mode has been pressed. If the button for switching to the 2D shooting mode has been pressed (in the case of "Yes"), the apparatus causes the procedure to make a transition to step S106. If not been pressed (in the case of "No"), the apparatus causes the procedure to make a transition to step S108.

[Step S106]

The 2D through image display viewpoint selecting part 34 causes the stereoscopic shooting part 32 to shoot a user's dominant-eye-side viewpoint image (a 2D image) based on the user's dominant eye information read at step S102, and causes the stereoscopic display part 14 to display its through image.

As shown in FIG. 14, in the case where the dominant eye is the right eye, the right viewpoint image (a 2D image) is displayed on the stereoscopic display part 14 as a through image. Here, when a shutter release button is pressed, only the user's dominant-eye-side viewpoint image (the 2D image) is shot, and recorded on the recording medium 30.

[Step S108]

The stereoscopic shooting apparatus 5 successively shots stereoscopic images (a left and right two viewpoint images), and causes the stereoscopic display part 14 to display the shot stereoscopic image (the 3D image) as a thorough image. Here, when the shutter release button is pressed, the stereoscopic image (a 2D image) is shot, and recorded in the recording medium 30.

According to the present method, the user's dominant-eye-side viewpoint image (the 2D image) can be displayed on the stereoscopic display part 14 when a through image is displayed at the time of 2D shooting mode, thereby improving ease of shooting a 2D image. Also, since the user does not feel uncomfortable when viewing a thing with the dominant eye, the user is less prone to be tired, and a larger amount of information can be advantageously obtained.

Note that the present method is not restricted to a shooting mode of a still picture but also can be applied to display at the time of switching between the 3D image and the 2D image at the time of moving-picture shooting mode.

Sixth Embodiment

Figure 16:
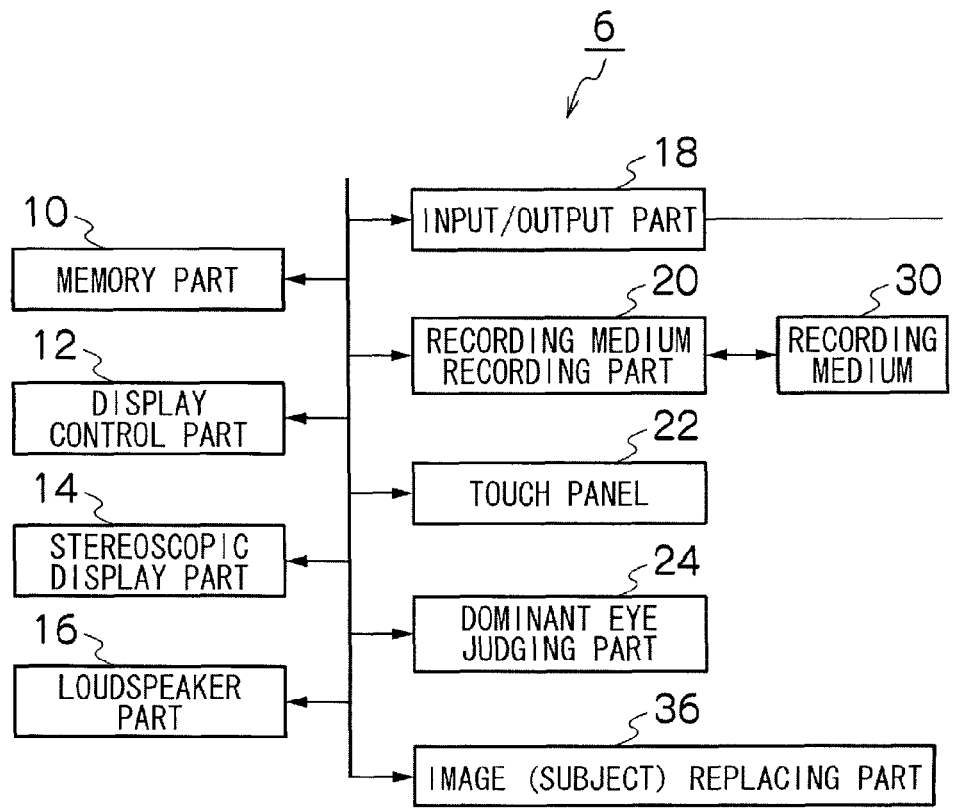
FIG. 16 is a block diagram showing a sixth embodiment of the stereoscopic display apparatus according to the present invention.

FIG. 16 is a block diagram showing a sixth embodiment of the stereoscopic display apparatus according to the present invention. Note that portions common to those in the first embodiment shown in FIG. 1 are provided with the same reference numerals and are not described in detail herein.

As shown in FIG. 16, a stereoscopic display apparatus 6 of the sixth embodiment is different from that of the first embodiment in that an image replacing part 36 is added.

Figure 17:
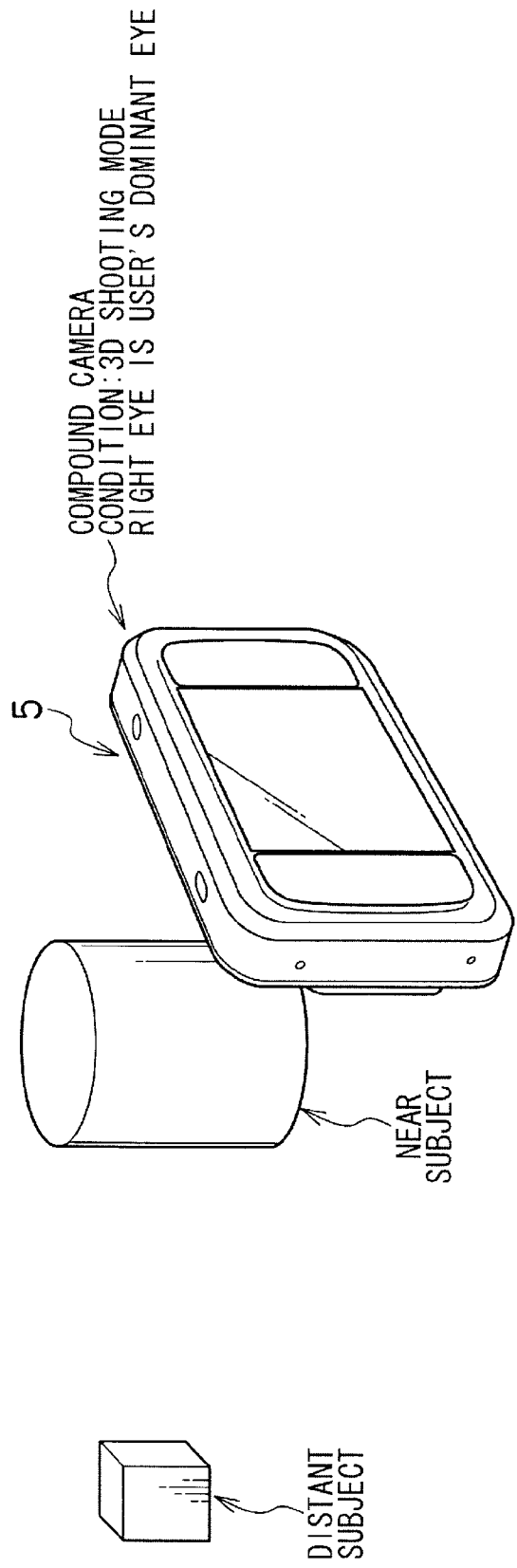
FIG. 17 is a diagram showing the state in which an object (a subject) away in a depth direction is shot by the stereoscopic shooting apparatus.

As shown in FIG. 17, when an object (a subject) away in a depth direction is shot by the stereoscopic shooting apparatus 5, an extremely near object has a large parallax, and cannot be stereoscopically viewed but merely appears doubled, which degrades the stereoscopic image.

To address this problem, in the sixth embodiment of the present invention, when a subject having a parallax equal to a specified pixel or higher is automatically specified or when a subject appearing doubled is specified by the user, a stereoscopic image of that subject portion is replaced by the dominant-eye-side viewpoint image, thereby improving quality of the stereoscopic image.

That is, the image replacing part 36 shown in FIG. 16 has a parallax amount detecting part detecting left and right parallax amounts of the stereoscopic image (the 3D image) and a region extracting part extracting a subject region exceeding a parallax amount set in advance (a specified number of pixels)

from among the detected parallax amounts or a parallax amount of a region appearing doubled, the region specified by the user. A stereoscopic image of the extracted subject region is replaced only by the dominant-eye-side viewpoint image corresponding to the user's dominant eye information registered in advance from the memory part 10 or the recording medium 30.

Figure 18:
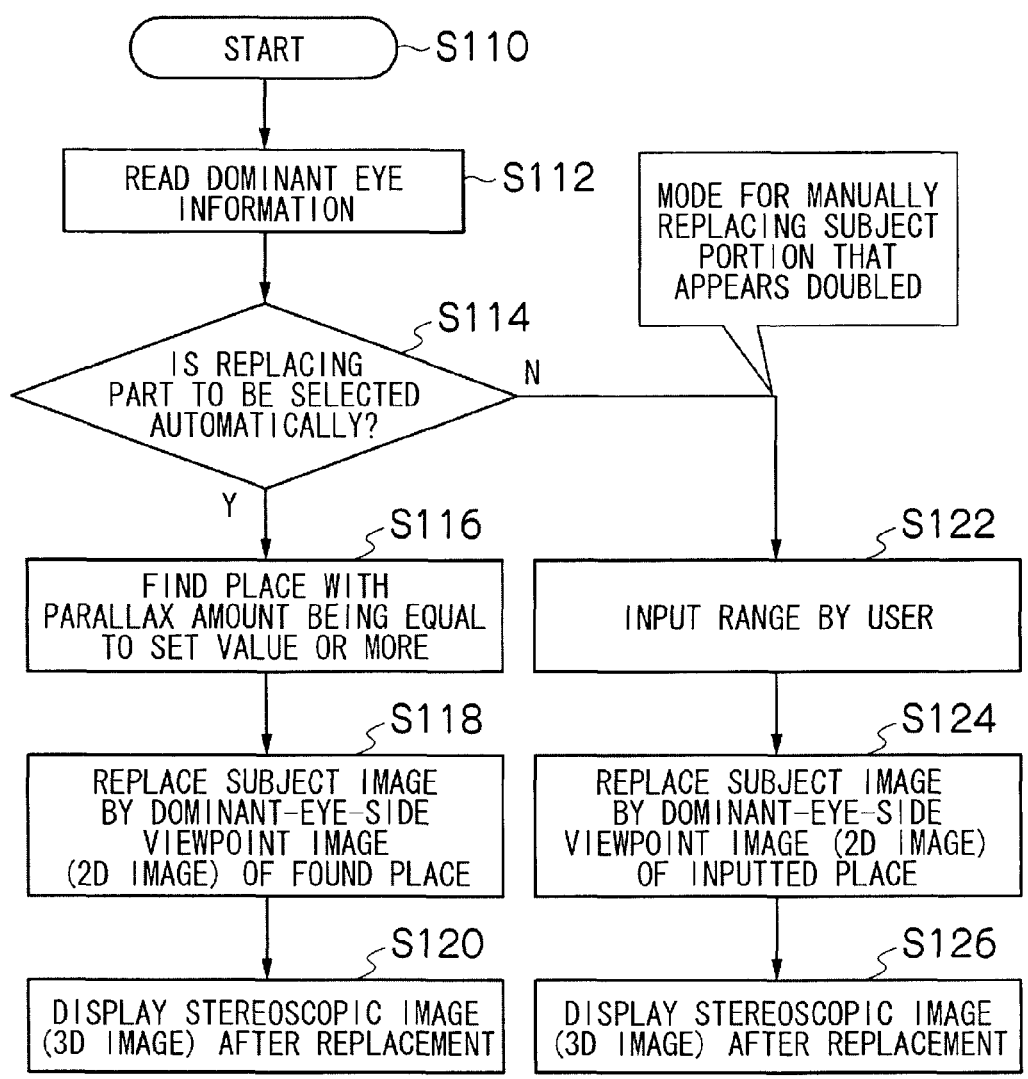
FIG. 18 is a flowchart showing the sixth embodiment of the present invention.

FIG. 18 is a flowchart showing the sixth embodiment of the present invention, and description is made below according to the flowchart shown in FIG. 18.

[Step S110]

Stereoscopic display by the stereoscopic display apparatus 6 is started. Note that the memory part 10 or the recording medium 30 is assumed to have user's dominant eye information registered therein at the start of stereoscopic display.

[Step S112]

The image replacing part 36 reads user's dominant eye information registered in advance from the memory part 10 or the recording medium 30. [Step S114]

The display control part 12 causes the stereoscopic display part 14 to display a screen accepting an instruction input as to whether a replacement portion is automatically selected or the mode is a replacement mode (a replacement mode in which a replacement portion is manually specified) to prompt a input of the user. When the replacement mode in which a replacement portion is automatically selected is selected (in the case of "Yes"), the procedure makes a transition to step S116. When the replacement mode in which a replacement portion is manually specified is selected (in the case of "No"), the procedure makes a transition to step S122.

[Step S116]

The region extracting part of the image replacing part 36 finds a place having a parallax amount equal to a parallax amount set in advance from the stereoscopic image. As the parallax amount set in advance, for example, ten pixels may be set by default, and this default value may be arbitrarily set by the user. This is because the merge limit allowing stereoscopic viewing varies depending on the user.

[Step S118]

Based on the user's dominant eye information read at step S112, the image replacing part 36 replaces the viewpoint image not on a user's dominant eye side at the found place by the user's dominant-eye-side viewpoint image (the 2D image).

Figure 19:
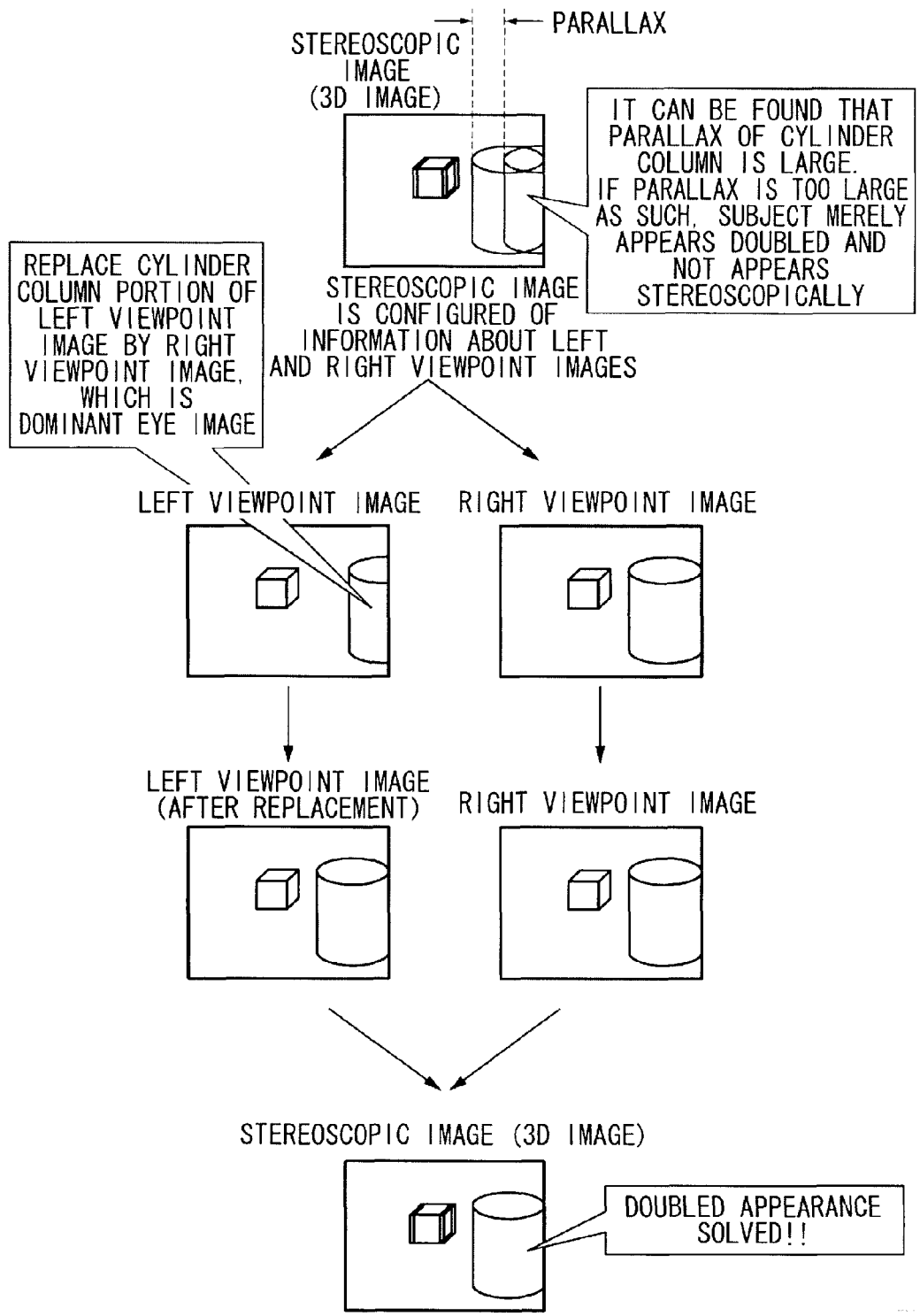
FIG. 19 is a diagram showing the state in which a partial image of a left viewpoint image with a large parallax is replaced by a corresponding partial image of a right viewpoint image.

As shown in FIG. 19, when the parallax between the left and right viewpoint images of a cylindrical column is larger than the parallax set in advance and the user's dominant eye is the right eye, an image of the cylindrical column portion of the left viewpoint image is replaced by an image of the cylindrical column portion of the right viewpoint image.

[Step S120]

The display control part 12 causes the stereoscopic display part 14 to display the stereoscopic image after replacement at step S118. With this, no place appearing doubled is present, thereby improving the quality of the stereoscopic image.

The present method is based on an idea "a 2D image is better than an image appearing doubled."

[Step S122]

When the replacement mode in which a replacement portion is manually specified is selected, the stereoscopic display apparatus 6 accepts an input of a range appearing doubled upon an instruction from the touch panel 22 by the user.

[Step S124]

Regarding the stereoscopic image in the range (an input place) accepted at step S122, based on the user's dominant eye information read at step S112, the image replacing part 36 replaces the viewpoint image not on a user's dominant eye side of the input place by the user's dominant-eye-side viewpoint image (the 2D image). Note that when the user specifies a range appearing doubled on the touch panel 22, a range having the same parallax as that of the specified range may be extracted, and the viewpoint image not on a user's dominant eye side of this extracted range may be replaced by the user's dominant-eye-side viewpoint image (the 2D image).

[Step S126]

The display control part 12 causes the stereoscopic display part 14 to display stereoscopic pixels after replacement at step S124. With this, no place specified in range by the user as appearing doubled is present, thereby improving the quality of the stereoscopic image.

Note that while description is made in the present embodiment in which the touch panel 22 on the stereoscopic display apparatus 6 is used as a coordinate input device for the user arbitrarily inputting position coordinates, this is not meant to be restrictive, and others may be applied as a coordinate input device, such as the one in which a cursor is 2D-displayed on the stereoscopic display device 6 and this cursor is moved by using a cross key or the like and also an OK button is pressed to input position coordinates, or a spatial sensor detecting a fingertip position of the user.

Modification Examples of Dominant Eye Judgement Image and Touch Input

First Modification Example

Figure 20:
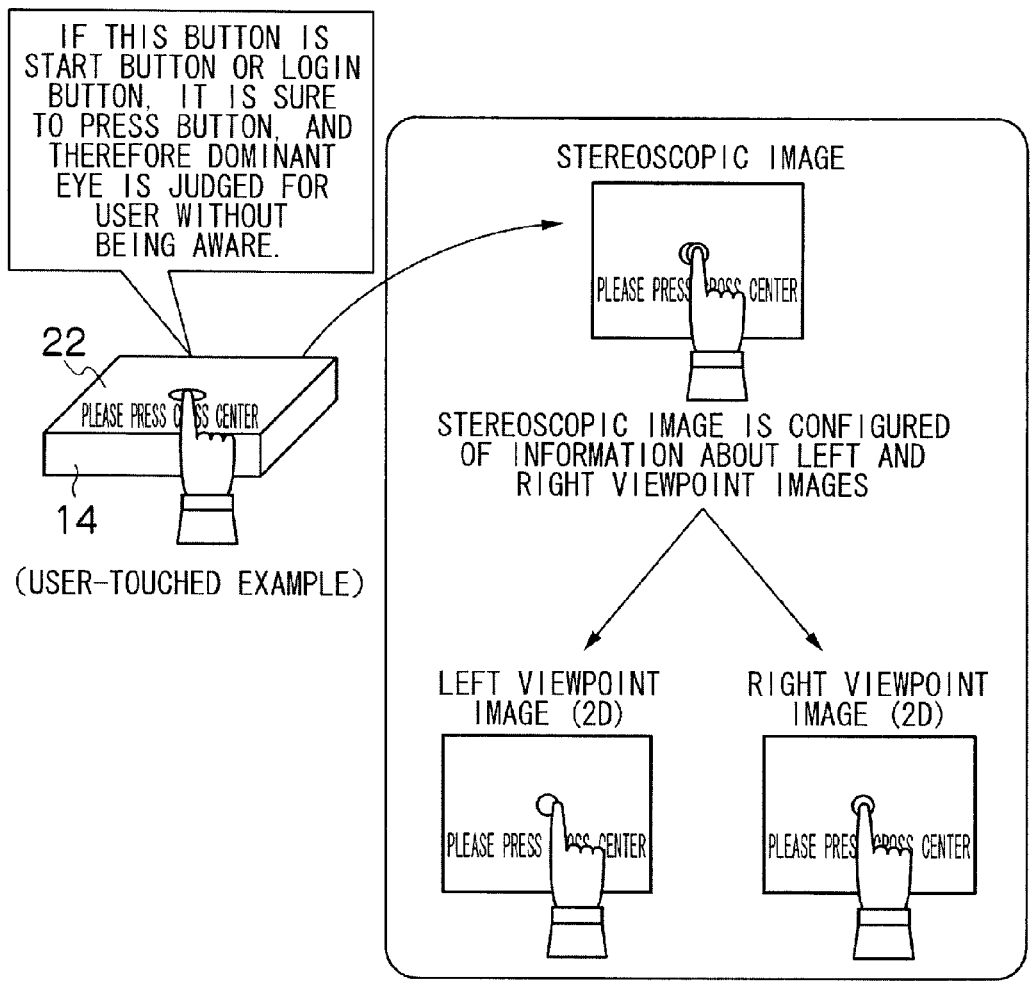
FIG. 20 is a diagram showing the state of using a button image as a dominant eye judgment image and that dominant eye judgment image is touched.

FIG. 20 is a diagram showing a dominant eye judgement image and the state of touching the dominant eye judgment image, and showing a first modification example in which a button image for operation is used in place of the mark image with a circle having a cross therein shown in FIG. 3.

In the first modification example shown in FIG. 20, an image representing a button for operation such as a start button or a login button is displayed on the stereoscopic display part 14 as a dominant eye judgment image. This button image is configured of a left viewpoint image and a right viewpoint image having a predetermined parallax, and has reference coordinates (center coordinates of the button image) of each image.

The display control part 12 (refer to FIG. 1) causes the stereoscopic display part 14 to display the button image as the dominant eye judgment image and characters "Please press the button." Note that in the case of a button image that is inevitably pressed, such as a start button or a login button, it is not required to display characters "Please press the button", and only a button name or the like is enough to be displayed.

When the user presses the button image stereoscopically displayed on the stereoscopic display part 14, a process corresponding to the pressing of the button image (such as start or login) is performed. Also, the dominant eye judging part 24 obtains position coordinates of the pressed button image via the touch panel 22, and judges the user's dominant eye based on these position coordinates and a reference position of each of the left viewpoint image and the right viewpoint image of the button image. This dominant eye judging method can be performed in a manner similar to that of the method described based on FIG. 4, [Equation 1], and [Equation 2].

According to the present method, only by touching the normally used button image displayed on the stereoscopic display part 14, discrimination of the dominant eye can be automatically made on a device side, and the result can be registered.

Note that in order to increase accuracy of a dominant eye judgment, a final dominant eye judgment may be made by means of majority decision regarding the results of dominant eye judgments made by touch operations on a plurality of button images (either same or different types of button images may be used).

Second Modification Example

Figure 21:
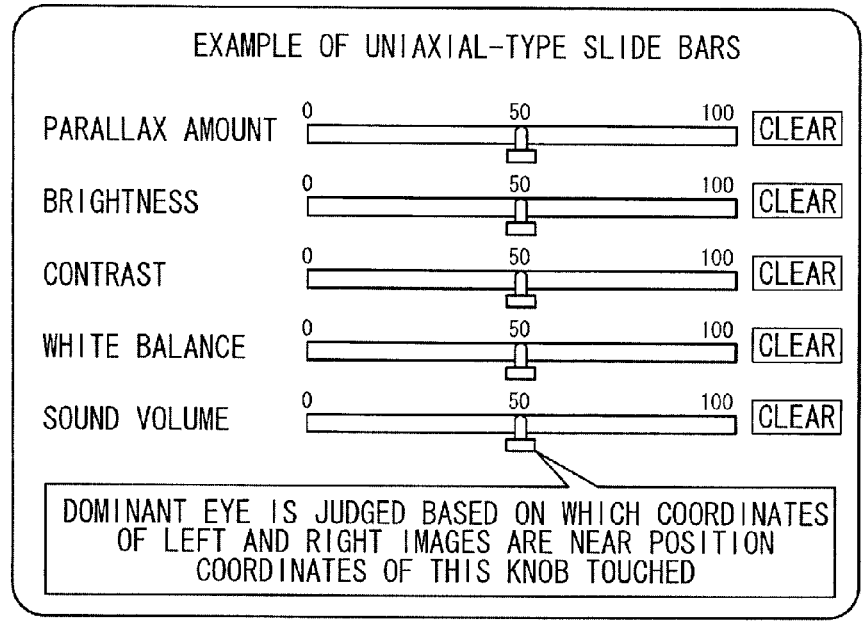
FIG. 21 is a diagram showing a display screen when uniaxial slide bar images are used as dominant eye judgment images.
Figure 22:
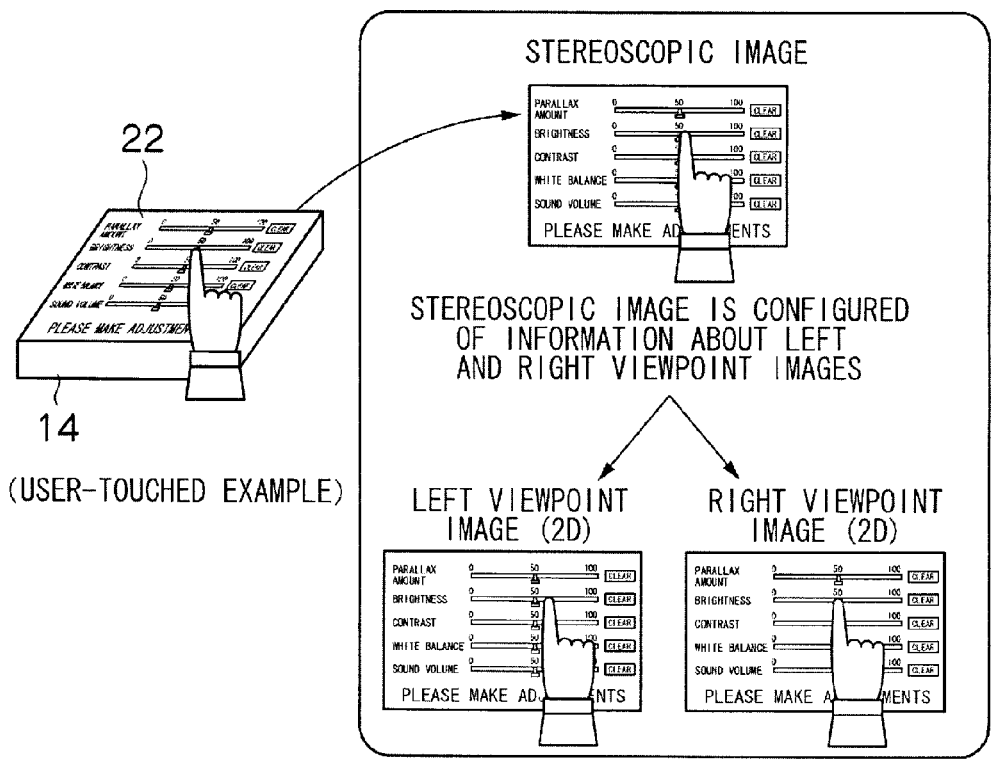
FIG. 22 is a diagram showing a state of using uniaxial-type slide bar images as dominant eye judgment images and that one dominant eye judgment image is touched.

FIG. 21 and FIG. 22 are diagrams showing a second modification example of the dominant eye judgement image, FIG. 21 showing a display screen of the stereoscopic display part 14 and FIG. 22 showing the state of touching the dominant eye judgment image displayed on the display screen.

In the second modification example shown in FIG. 21 and FIG. 22, images representing five uniaxial-type slide bars (slide bar images) are displayed on the stereoscopic display part 14 as the dominant eye judgment images. These slide bar images are formed of slide bar images for adjusting the parallax amount, brightness, contrast, white balance, and sound volume of the stereoscopic image, and each slide bar image is configured of a left viewpoint image and a right viewpoint image having a predetermined parallax and also has reference coordinates (center coordinates of a knob in each slide bar image) of each image.

The display control part 12 (refer to FIG. 1) causes the stereoscopic display part 14 to display the slide bar images described above as the dominant eye judgment images and characters "Please make various adjustments."

When the user touches the knob in a slide bar image and moves (drags) the knob, an adjustment corresponding to the position of the knob is performed. Also, the dominant eye judging part 24 obtains, via the touch panel 22, position coordinates of the first touched knob of the slide bar image, and judges the user's dominant eye based on these position coordinates and the position of the knob in the slide bar image (a reference position of each of the left viewpoint image and the right viewpoint image of the knob before touching). This dominant eye judging method can be performed in a manner similar to that of the method described based on FIG. 4, [Equation 1], and [Equation 2].

According to the present method, only with a touch operation on any of the slide bar images for adjustment displayed on the stereoscopic display part 14, discrimination of the dominant eye can be automatically made on a device side, and the result can be registered.

Note that when a touch operation is performed on a plurality of slide bar images, a final dominant eye judgment may be made by means of majority decision regarding the results of dominant eye judgments made by the respective touch operations.

Third Modification Example

Figure 23:
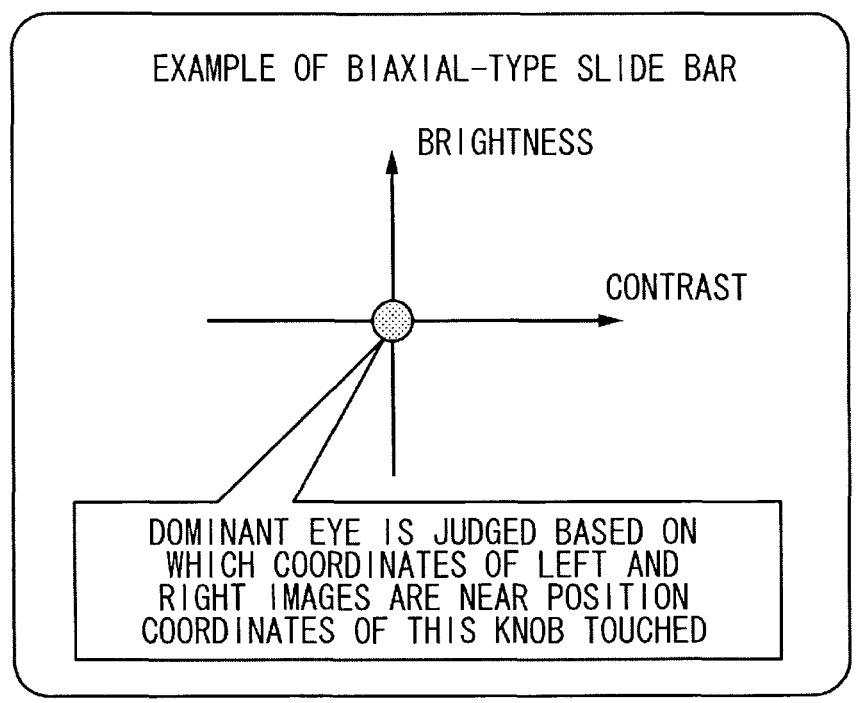
FIG. 23 is a diagram showing a display screen of a stereoscopic display part when a biaxial-type slide bar image is used as a dominant eye judgment image.

FIG. 23 is a diagram showing a third modification example of the dominant eye judgement image, showing a biaxial-type slide bar image.

In the third modification example shown in FIG. 23, an image representing a biaxial-type slide bar (a slide bar image) is displayed on the stereoscopic display part 14 as the dominant eye judgment image. This slide bar image is to adjust contrast of the stereoscopic image with the position of a knob in a horizontal direction and to adjust brightness of the stereoscopic image with the position thereof in a vertical direction, is configured of a left viewpoint image and a right viewpoint image having a predetermined parallax, and has reference coordinates (center coordinates of the knob in the slide bar image) of each image.

When the user touches the knob in the slide bar image and moves (drags) the knob in a two-dimensional plane, an adjustment corresponding to the position of the knob is performed. Also, the dominant eye judging part 24 obtains, via the touch panel 22, two-dimensional position coordinates of the first touched knob of the slide bar image, and judges the user's dominant eye based on these position coordinates and the position of the knob in the slide bar image (a reference position of each of the left viewpoint image and the right viewpoint image of the knob before touching). This dominant eye judging method can be performed in a manner similar to that of the method described based on FIG. 4, [Equation 1], and [Equation 2].

Note that a stereoscopically viewable joy stick image may be used in place of the biaxial-type slide bar image of the third modification example described above.

Fourth Modification Example

Figure 24:
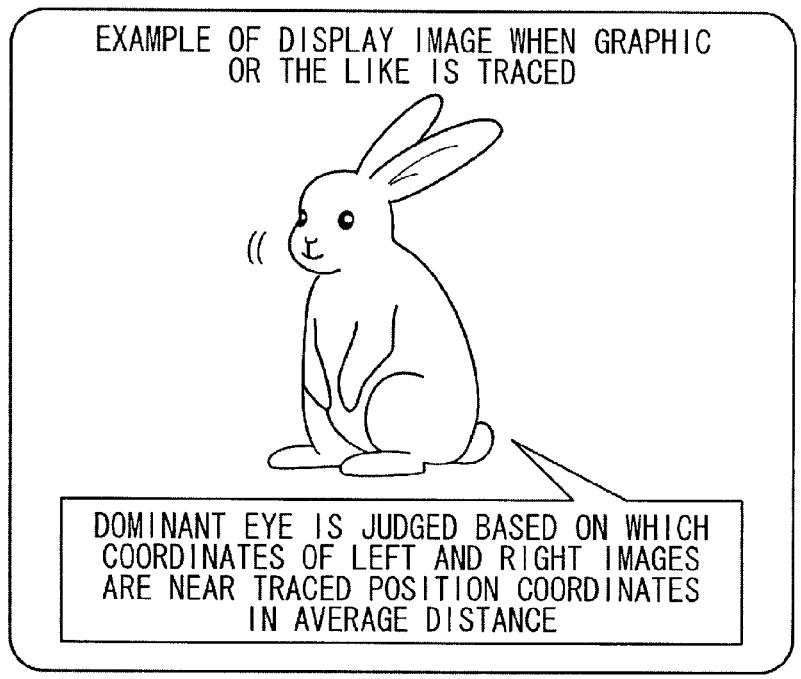
FIG. 24 is a diagram showing a display screen of a stereoscopic display part when a line drawing representing a rabbit is used as a dominant eye judgment image.

FIG. 24 is a diagram showing a fourth modification example of the dominant eye judgment image, showing a line drawing representing a rabbit in this example.

In the fourth modification example shown in FIG. 24, a stereoscopically viewable line drawing is displayed on the stereoscopic display part 14 as the dominant eye judgment image. This line drawing is for the user to trace its contour, is configured of a left viewpoint image and a right viewpoint image having a predetermined parallax, and has coordinates of a contour line in each image.

When the user traces the line drawing displayed on the stereoscopic display part 14, the dominant eye judging part 24 obtains coordinates of the traced track via the touch panel 22, and judges the user's dominant eye based on the coordinates of the traced track and coordinates of the counter line of the line drawing (coordinates of the contour line of each of the left viewpoint image and the right viewpoint image). In this dominant eye judging method, an average distance of shortest distances between the coordinates of the traced track and the coordinates of the contour line of the left viewpoint image of the line drawing and an average distance of shortest distances between the coordinates of the traced track and the coordinates of the contour line of the right viewpoint image of the line drawing are found, and the user's dominant eye is judged depending on one of the average distances that is smaller (that is, whether the traced track is near the line drawing of the left viewpoint image or the line drawing of the right viewpoint image).

Note that a simple graphic is preferable as the line drawing, such as an easily-traceable picture or circle. Also, a user's dominant eye judgment can be performed without tracing the whole contour line of the line drawing.

Fifth Modification Example

Figure 25:
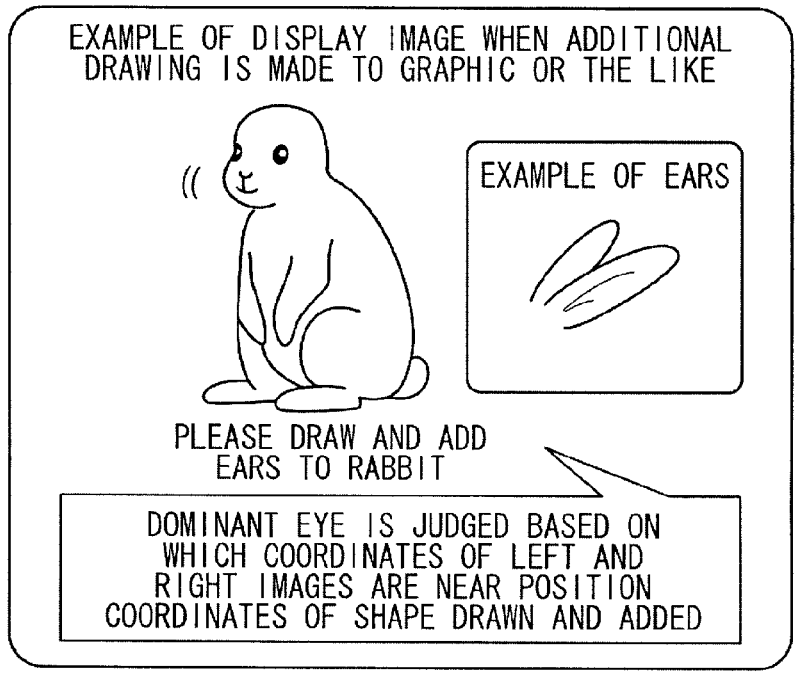
FIG. 25 is a diagram showing a display screen of the stereoscopic display part when an unfinished picture (an image of a rabbit without ears) is used as a dominant eye judgment image.
Figure 26:
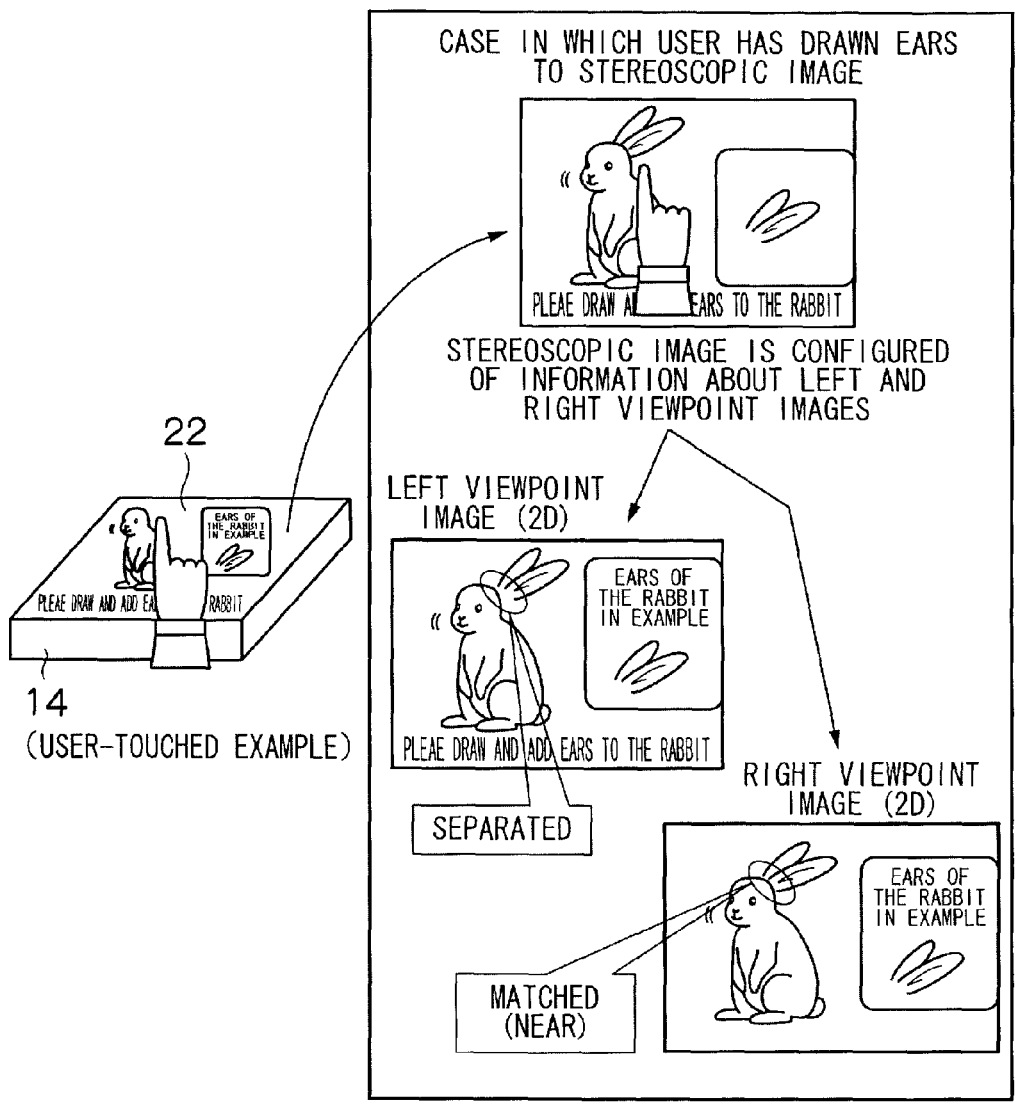
FIG. 26 is a diagram showing the state of adding an image (an image of ears) the dominant eye judgment image displayed on the display screen of the stereoscopic display part lacks.

FIG. 25 and FIG. 26 are diagrams showing a fifth modification example of the dominant eye judgement image, FIG. 25 showing a display screen of the stereoscopic display part 14 and FIG. 26 showing the state of adding an image the dominant eye judgement image displayed on the display screen lacks.

In the fifth modification example shown in FIG. 25 and FIG. 26, an unfinished picture or graphic (an image of a rabbit without ears in FIG. 25) is displayed on the stereoscopic display part 14 as the dominant eye judgment image. This image of the rabbit without ears is for the user to draw a lacking part (ears), is configured of a left viewpoint image and a right viewpoint image having a predetermined parallax, and has coordinates of a contour line of a head part (a portion where ears are to be drawn) in each image.

The display control part 12 (refer to FIG. 1) causes the stereoscopic display part 14 to display the image of the rabbit without ears as the dominant eye judgment image and characters "Please draw and add ears to the rabbit."

When the user draws ears of the rabbit with a finger (or a touch pen) on the touch panel 22 to the image of the rabbit without ears displayed on the stereoscopic display part 14, the display control part 12 causes the stereoscopic display part 14 to display the drawn ears of the rabbit in 2D display. On the other hand, the dominant eye judging part 24 obtains coordinates of the drawn track of the ears of the rabbit (in particular, a base portion of the ears) via the touch panel 22, and judges the user's dominant eye based on the coordinates of the drawn ears of the rabbit and coordinates of the contour lines of the left viewpoint image and the right viewpoint image of the head part of the rabbit.

That is, the user's dominant eye is judged depending on whether the base portion of the ears of the rabbit drawn as shown in FIG. 26 matches (similar to) the contour line of the left viewpoint image of the head part of the rabbit or matches (similar to) the contour line of the right viewpoint image thereof.

Note that while the user draws ears of the rabbit in this example, this is not meant to be restrictive. An image of ears of the rabbit (a part image) may be prepared in advance, and this part image may be dragged to be attached to the head part of the rabbit. Also, the unfinished picture is not restricted to a picture of a rabbit without ears, and any picture can be used. Furthermore, the unfinished picture is not restricted to a picture, and a graphic (for example, a polygon without one side) may be used.

According to the present method, discrimination of the dominant eye can be automatically made on a device side while the user is enjoying drawing, and the result can be registered.

Seventh Embodiment

Figure 27:
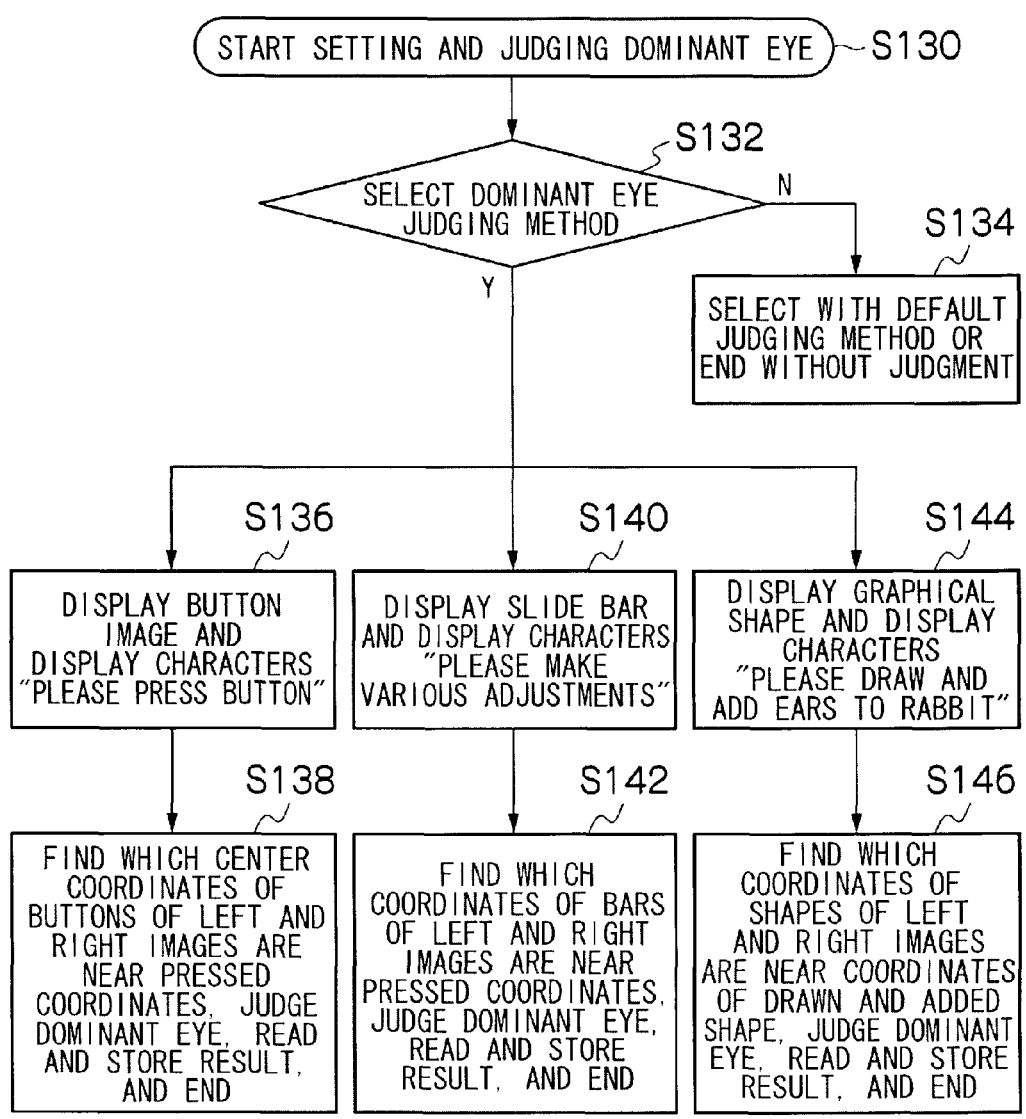
FIG. 27 is a flowchart showing a seventh embodiment of the present invention.
Figure 28:
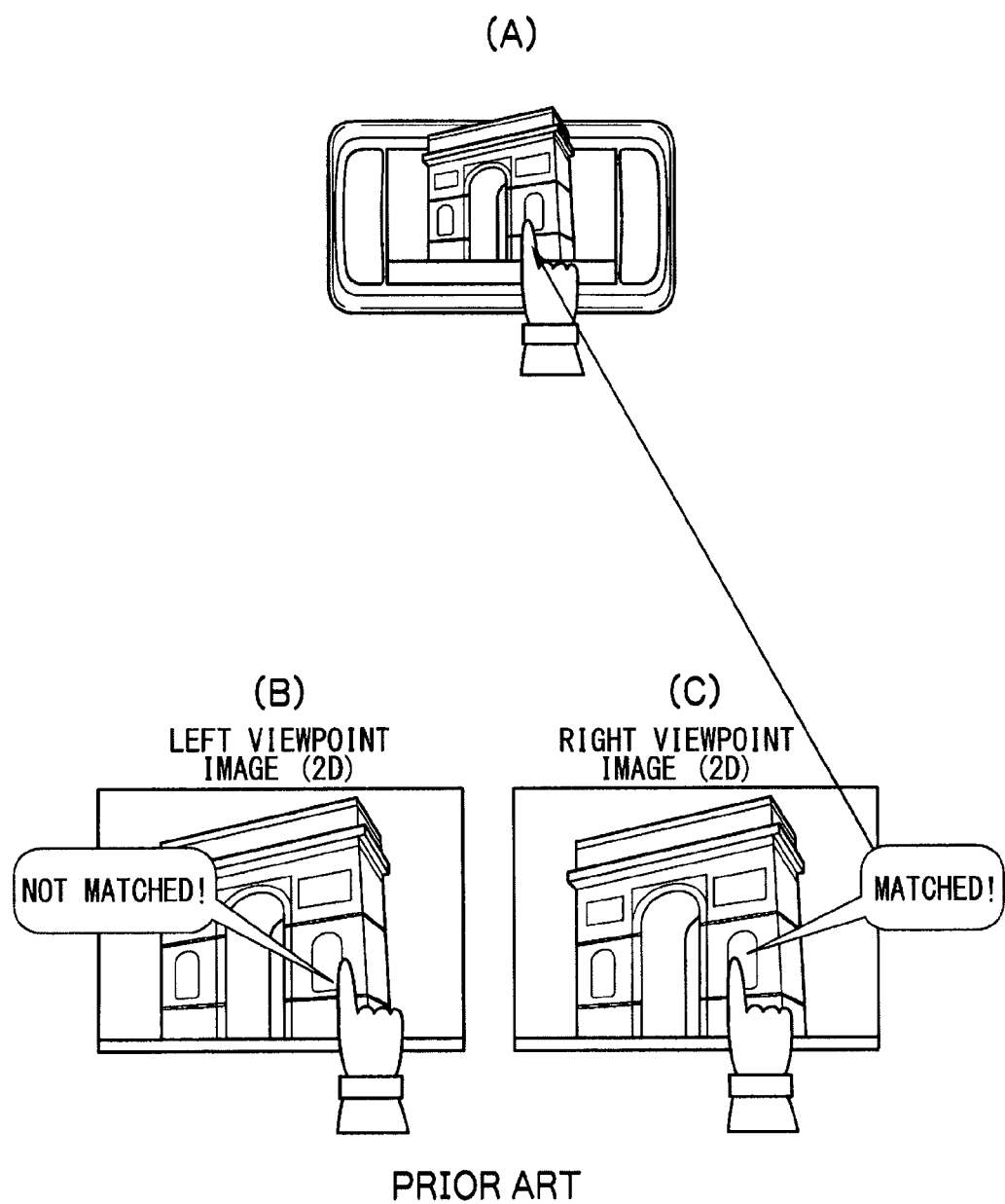
FIG. 28 is a diagram showing a relation between a place thought to have been touched on a stereoscopic image and positions actually touched on left and right viewpoint images.

FIG. 27 is a flowchart showing a seventh embodiment of the present invention, and description is made below in accordance with the flowchart shown in FIG. 27.

[Step S130]

Dominant eye setting and judgment by a stereoscopic display apparatus 6 are started.

[Step S132]

When dominant eye setting and judgement are started, the display control part 12 (refer to FIG. 1) first causes the stereoscopic display part 14 to display a menu for selecting a dominant eye judging method, thereby prompting the user to select a desired dominant eye judging method. As the menu for selecting a dominant eye judging method, the dominant eye judging method using the button image of FIG. 20, the dominant eye judging method using the slide bar images of FIG. 21, the dominant eye judging method using the unfinished picture (the picture of the rabbit without ears of FIG. 25), a default dominant eye judging method (for example, the dominant eye judging method using the dominant eye judgment image shown in FIG. 3), and others are presented, and any can be selected as appropriate.

[Step S134]

When the default dominant eye judging method is selected, the procedure makes a transition to the process of that default dominant eye judging method. Also, when a dominant eye judgment is not made, the procedure ends without performing a dominant eye judgment.

[Step S136]

At step S132, when the dominant eye judging method using the button image of FIG. 20 is selected, the display control part 12 causes the stereoscopic display part 14 to display the button image as the dominant eye judgment image and characters "Please press the button."

[Step S138]

When the button image is pressed by the user, the dominant eye judging part 24 obtains position coordinates of the pressed button image via the touch panel 22, makes a user's dominant eye judgment depending on whether these position coordinates are near the reference position of the left viewpoint image of the button image or the reference position of the right viewpoint image thereof, stores the dominant eye judgment result, and ends the procedure.

[Step S140]

When the dominant eye judging method using the slide bar images of FIG. 21 is selected at step S132, the display control part 12 causes the stereoscopic display part 14 to display the slide bar images as the dominant eye judgment images and characters "Please make various adjustments."

[Step S142]

When the knob of a slide bar image is touched by the user for operation, the dominant eye judging part 24 obtains first touched position coordinates via the touch panel 22, makes a user's dominant eye judgment depending on whether these position coordinates represent a position before the operation of the knob of the slide bar image and are near the position of the knob of the left viewpoint image or near the position of the knob of the right viewpoint image thereof, stores the dominant eye judgment result, and ends the procedure.

[Step S144]

When the dominant eye judging method using the picture of the rabbit without ears of FIG. 25 is selected at step S132, the display control part 12 causes the stereoscopic display part 14 to display the picture of the rabbit without ears as the dominant eye judgment image and characters "Please draw and add ears to the rabbit."

[Step S146]

Upon the ears of the rabbit drawn and added by the user, the dominant eye judging part 24 obtains coordinates of the base portion of the drawn and added ears of the rabbit via the touch panel 22, makes a dominant eye judgment depending on whether the coordinates of the base portion of the ears represent coordinates of the contour line of the head part of the rabbit without ears and are near coordinates of the contour line of the head part of the left viewpoint image or near coordinates of the contour line of the head part of the right viewpoint image thereof, stores the dominant eye judgment result, and ends the procedure.

Note that the present invention is not restricted to the embodiments described above and can be variously modified within a range not deviating from the spirit of the present invention.

REFERENCE SIGNS LIST 1, 2, 3, 4, 6 . . . stereoscopic display apparatus, 5 . . . stereoscopic shooting apparatus, 10 . . . memory part, 12 . . . display control part, 14 . . . stereoscopic display part, 16 . . . loudspeaker part, 18 . . . input/output part, 20 . . . recording medium recording part, 22 . . . touch panel, 24 . . . dominant eye judging part, 26 . . . stereoscopic touched position coordinate determining part, 28 . . . 3D/2D display mode switching part, 30 . . . recording medium, 32 . . . stereoscopic shooting part, 34 . . . 2D through image display viewpoint selecting part, 36 . . . image replacing part

The invention claimed is:

1. A stereoscopic display apparatus comprising:
a stereoscopic display part displaying a stereoscopic image formed of a left viewpoint image and a right viewpoint image;
a coordinate input part inputting desired position coordinate on a display surface of the stereoscopic display part;
a display control part causing the stereoscopic display part to display a dominant eye judgment image formed of a left viewpoint image and a right viewpoint image for judging a dominant eye of a user, the dominant eye judgment image representing different reference coordinates between the left viewpoint image and the right viewpoint image;
an obtaining part obtaining position coordinates inputted by the user via the coordinate input part for the dominant eye judgment image displayed on the stereoscopic display part; and
a judging part judging the dominant eye of the user inputting the position coordinates via the coordinate input part based on the reference coordinates of the dominant eye judgment image formed of the left viewpoint image and the right viewpoint image and the obtained position coordinates, depending on whether the obtained position coordinates are near the reference coordinates of the left viewpoint image or the reference coordinates of the right viewpoint image,
wherein
the display control part causes the stereoscopic display part to display an icon image for operation as the dominant eye judgment image, and
the coordinate input part is a touch panel provided on the display surface of the stereoscopic display part;
a storing and registering part storing and registering information about the dominant eye of the user inside the apparatus;
a parallax amount detecting part detecting parallax amounts of left and right of the stereoscopic image formed of the left viewpoint image and the right viewpoint image to be displayed on the stereoscopic display part;
a region extracting part extracting a region having a parallax amount exceeding a parallax amount previously set or a parallax amount of a region appearing doubled and specified by the user from out of the parallax amounts detected by the parallax amount detecting part; and
an image replacing part replacing a stereoscopic in of the region extracted by the region extracting part only by the user's dominant-eye-side viewpoint image corresponding to the information about the dominant eye of the user registered in the storing and registering part.

2. The stereoscopic display apparatus according to claim 1, wherein
the display control part causes the stereoscopic display part to display a button image such as a start button or a login button as the dominant eye judgment image.

3. The stereoscopic display apparatus according to claim 1, wherein
the display control part causes the stereoscopic display part to display a slide bar image including a knob for operation as the dominant eye judgment image.

4. The stereoscopic display apparatus according to claim 1, wherein
the display control part causes the stereoscopic display part to display a line drawing as the dominant eye judgment image, and the judging part judges the dominant eye of the user tracing the line drawing based on an average distance between coordinates of each contour line of the dominant eye judgment image formed of the left viewpoint image and the right viewpoint image representing the line drawing and coordinates successively obtained by the coordinate input part by tracing the line drawing.

5. The stereoscopic display apparatus according to claim 1, wherein
the display control part causes the stereoscopic display part to display a unfinished picture or graphic as the dominant eye judgment image, and
based on reference coordinates of the dominant eye judgment image formed of the left viewpoint image and the right viewpoint image representing the unfinished picture or graphic and position coordinates of a picture or graphic added to finish the unfinished picture or graphic by the coordinate input part, the judging part judges the dominant eye of the adding user.

6. The stereoscopic display apparatus according to claim 1, wherein
the judging part judges a right eye as the dominant eye when the dominant eye of the user inputting the position coordinates via the coordinate input part cannot be judged.

7. The stereoscopic display apparatus according to claim 1, wherein
the storing and registering part automatically stores and registers the information about the dominant eye based on the judgment result by the judging part.

8. The stereoscopic display apparatus according to claim 1, wherein
the storing and registering part has a dominant eye information input part accepting information about the dominant eye of the user indicated and inputted from the user, and stores and registers the information about the dominant eye of the user accepted by the dominant eye information input part.

9. The stereoscopic display apparatus according to claim 1, comprising a position input part accepting, via the coordinate input part, position coordinates of a desired target image on the stereoscopic image displayed on the stereoscopic display part, wherein
the position coordinates accepted from the position input part are handled as a coordinate position on a dominant-eye-side viewpoint image from out of the left viewpoint image and the right viewpoint image of the stereoscopic image, the dominant-eye-side viewpoint image corresponding to the information about the dominant eye of the user registered in the storing and registering part.

10. The stereoscopic display apparatus according to claim 1, comprising a display mode switching part switching between a 3D display mode for causing the stereoscopic display part to display the stereoscopic image formed of the left viewpoint image and the right viewpoint image and a 2D display mode for causing the stereoscopic display part to display either one viewpoint image from out of the left viewpoint image and the right viewpoint image configuring the stereoscopic image, wherein
at the time of switching by the display mode switching part to the 2D display mode, the display control part causes the stereoscopic display part to display a user's dominant-eye-side viewpoint image from out of the left viewpoint image and the right viewpoint image based on the information about the dominant eye of the user registered in the storing and registering part.

11. The stereoscopic display apparatus according to claim 10, wherein
the display mode switching part alternately switches among the 2D display mode and the 3D display mode every time a touch is detected by the touch panel.

12. The stereoscopic display apparatus according to claim 10, wherein
the display mode switching part switches to the 2D display mode when a touch is detected by the touch panel, and switches to the 3D display mode when a touch is not detected by the touch panel or a touch is not detected for a predetermined period of time or more.

13. A stereoscopic shooting apparatus including the stereoscopic display apparatus according to claim 1, the stereoscopic shooting apparatus comprising:
a shooting mode switching part switching between a 2D shooting mode for shooting a two-dimensional image and a 3D shooting mode for shooting a stereoscopic image formed of a left viewpoint image and a right viewpoint image; and
a control part causing the stereoscopic display part to display the user's dominant-eye-side viewpoint image corresponding to the information about the dominant eye of the user registered in the storing and registering part from out of the left viewpoint image and the right viewpoint image when switching is made by the shooting mode switching part to the 2D shooting mode.

14. The stereoscopic display apparatus according to claim 1, wherein
the display control part causes the stereoscopic display part to display a plurality of dominant eye judgment images on the stereoscopic display part, and
the judging part makes a final dominant eye judgment by means of majority decision regarding results of dominant eye judgments which have been respectively made by the plurality of dominant eye judgment images.

15. A dominant eye judging method using a stereoscopic display apparatus having a stereoscopic display part and a coordinate input part inputting desired position coordinates on a display surface of the stereoscopic display part, the method comprising the steps of:

causing the stereoscopic display part to display a dominant eye judgment image formed of a left viewpoint image and a right viewpoint image for judging a dominant eye of a user, the dominant eye judgment image representing different reference coordinates between the left viewpoint image and the right viewpoint image;
obtaining position coordinates inputted by the user via the coordinate input part for the dominant eye judgment image displayed on the stereoscopic display part; and
judging the dominant eye of the user inputting the position coordinates via the coordinate input part based on the reference coordinates of the dominant eye judgment image formed of the left viewpoint image and the right viewpoint image and the obtained position coordinates, depending on whether the obtained position coordinates are near the reference coordinates of the left viewpoint image or the reference coordinates of the right viewpoint image,
wherein
in the step of causing, the stereoscopic display part is controlled to display an icon image for operation as the dominant eye judgment image, and
the coordinate input part is a touch panel provided on the display surface of the stereoscopic display part;
storing and registering information about the dominant eye of the user inside the apparatus;
detecting parallax amounts of left and right of the stereoscopic image formed of the left viewpoint image and the right viewpoint image to be displayed;
extracting a region having a parallax amount exceeding a parallax amount previously set or a parallax amount of a region appearing doubled and specified by the user from out of the parallax amounts detected; and
replacing a stereoscopic image of the region extracted only by the user's dominant-eye-side viewpoint image corresponding to the registered and stored information about the dominant eye of the user.

16. A recording medium having a computer-readable code of the program causing the stereoscopic display apparatus to execute the dominant eye judging method according to claim 15 recorded thereon.

* * * * *